US008674971B2

(12) United States Patent
Kobashi

(10) Patent No.: US 8,674,971 B2
(45) Date of Patent: Mar. 18, 2014

(54) DISPLAY DEVICE AND ELECTRONIC APPARATUS INCLUDING DISPLAY DEVICE

(75) Inventor: Yutaka Kobashi, Mizuho (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 979 days.

(21) Appl. No.: 12/117,265

(22) Filed: May 8, 2008

(65) Prior Publication Data

US 2008/0278667 A1     Nov. 13, 2008

(30) Foreign Application Priority Data

May 8, 2007     (JP) ................................ 2007-123077
Feb. 25, 2008   (JP) ................................ 2008-042507

(51) Int. Cl.
G09G 5/00     (2006.01)
G06F 3/038    (2013.01)
G06F 3/042    (2006.01)
G06F 3/033    (2013.01)

(52) U.S. Cl.
USPC ........................... 345/207; 345/175; 345/179

(58) Field of Classification Search
USPC .................... 345/173, 175, 179, 207, 81, 697
See application file for complete search history.

(56) References Cited

U.S. PATENT DOCUMENTS

| | | | | |
|---|---|---|---|---|
| 4,916,308 | A * | 4/1990 | Meadows | 250/221 |
| 6,707,027 | B2 * | 3/2004 | Liess et al. | 250/221 |
| 7,772,869 | B2 * | 8/2010 | Lee et al. | 324/760.01 |
| 2002/0084992 | A1 * | 7/2002 | Agnew | 345/173 |
| 2006/0119590 | A1 * | 6/2006 | Park et al. | 345/175 |
| 2006/0256093 | A1 * | 11/2006 | Furukawa et al. | 345/173 |
| 2006/0262066 | A1 * | 11/2006 | Yamazaki et al. | 345/98 |
| 2006/0290683 | A1 * | 12/2006 | Pasquariello et al. | 345/175 |
| 2007/0091013 | A1 * | 4/2007 | Pak et al. | 345/50 |
| 2007/0134883 | A1 * | 6/2007 | Lee et al. | 438/398 |
| 2007/0176908 | A1 * | 8/2007 | Lipman et al. | 345/179 |
| 2009/0066897 | A1 | 3/2009 | Katoh et al. | |

FOREIGN PATENT DOCUMENTS

| | | |
|---|---|---|
| JP | A 2006-118965 | 5/2006 |
| JP | 2007-086147 | 4/2007 |
| JP | 2007-102025 | 4/2007 |
| KR | 10-2006-0129876 A | 12/2006 |
| WO | WO 2006/117956 A1 | 11/2006 |

OTHER PUBLICATIONS

Office Action issued Sep. 11, 2012 for corresponding Japanese Appln No. 2008-042507.

* cited by examiner

Primary Examiner — Alexander S Beck
Assistant Examiner — Nguyen H Truong
(74) Attorney, Agent, or Firm — K&L Gates LLP

(57) ABSTRACT

A display device includes an active matrix circuit for display, a plurality of bus lines which are connected to the active matrix circuit and which are used to transmit driving signals, driving circuits which supply the driving signals to the plurality of bus lines, the plurality of bus lines and the driving circuits being arranged on a substrate, and optical sensors arranged on the substrate. The optical sensors are arranged in a plurality of sub regions separated using the plurality of bus lines. The plurality of sub regions are arranged between the active matrix circuit and each of the driving circuits.

15 Claims, 21 Drawing Sheets

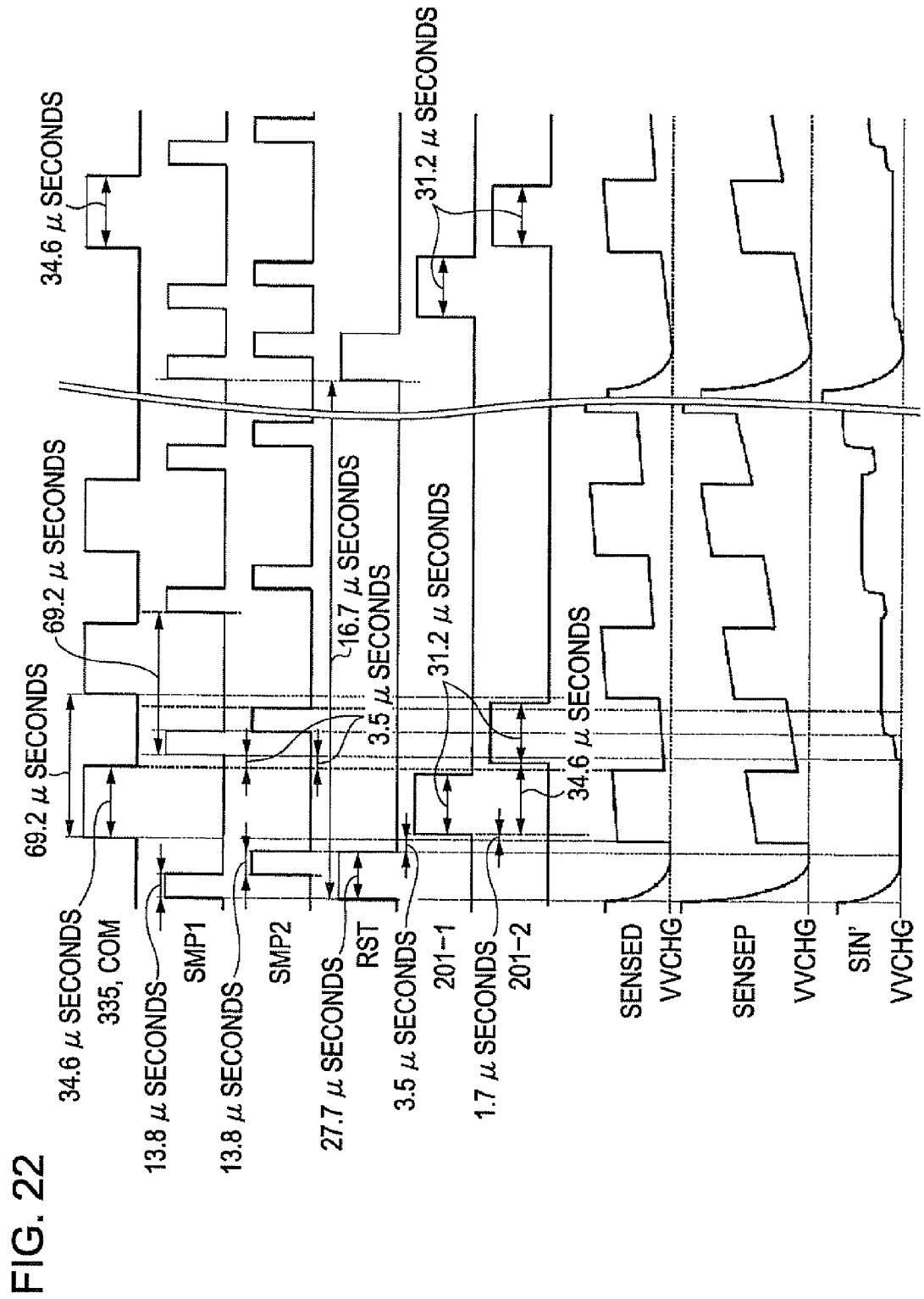

DISPLAY DEVICE AND ELECTRONIC APPARATUS INCLUDING DISPLAY DEVICE

BACKGROUND

1. Technical Field

The present invention relates to a display device and an electronic apparatus including the display device.

2. Related Art

In recent years, a technique of incorporating an optical sensing function in a liquid crystal display device employing a thin film transistor, in particular, has been developed (refer to Japanese Unexamined Patent Application Publication No. 2006-118965, for example) in order to obtain the following advantages using optical sensors. (1) Power consumption is reduced and image quality is improved by controlling luminance, for example, by measuring external light. (2) The luminance and chromaticity is controlled by measuring backlight. (3) The optical sensors are used as a touch key so as to detect a position of a finger or a light pen. Examples of the optical sensors include thin-film transistors, PIN (p-intrinsic-n) diodes, and PN diodes. The optical sensors preferably have light-receiving sections formed of silicone thin films, and a process of fabricating the optical sensors are preferably performed simultaneously with a process of fabricating switching elements which are formed of silicon thin films and which are used for display so that increase of fabrication cost is suppressed.

In terms of accuracy of measurement of a light intensity and design, the optical sensors are preferably disposed near a display region of a display device. However, in a liquid crystal display device incorporating a driving circuit, it is difficult to dispose the optical sensors in an inner side relative to the driving circuit. Furthermore, when the optical sensor is disposed near the display region, the optical sensors are likely to be influenced by electrical noise generated by driving the display region, and are likely to be influenced by stray light emitted from the display region. Therefore, there arises a problem in that sensing accuracy of the optical sensor is deteriorated. This problem is remarkable for the liquid crystal display device which performs common potential inversion driving.

SUMMARY

An advantage of some aspects of the invention is that there is provided a display device including an active matrix circuit for display, a plurality of bus lines which are connected to the active matrix circuit and which are used to transmit driving signals, driving circuits which supply the driving signals to the plurality of bus lines, the plurality of bus lines and the driving circuits being arranged on a substrate, and optical sensors arranged on the substrate. The optical sensors are arranged in a plurality of sub regions separated using the plurality of bus lines. The plurality of sub regions are arranged between the active matrix circuit and each of the driving circuits. With this configuration, the optical sensors are arranged near the display region even in driving-circuit incorporating liquid crystal display device. Accordingly, an intensity of external light is accurately detected, and the versatility of design features of an electronic apparatus is improved.

The display device may further include a plurality of pixel electrodes connected to the active matrix circuit, a common electrode driven so that a potential of the common electrode is switched between a first potential and a second potential which is lower than the first potential, liquid crystal elements alignment states of which are changed in accordance with an electric field applied between the plurality of pixel electrodes and the common electrode, sensor lines connected to the optical sensors, and a detection circuit which is connected to the sensor lines and which detects potentials or currents of the sensor lines. The detection circuit detects the potentials or the currents of the sensor lines when a first period of time which is one of a period of time in which the potential of the common electrode corresponds to the first potential and a period of time in which the potential of the common electrode corresponds to the second potential is entered. With this configuration, power consumption of the liquid crystal display device is reduced using a so-called common AC driving which is a method for inversely driving the common electrode. Consequently, deterioration of accuracy of the detection caused by change of the potentials of the sensor lines due to electromagnetic noise generated by inversely driving the common electrode and coupling capacitance regarding the common electrode.

The detection circuit may repeatedly perform a resetting operation of resetting the potentials of the sensor lines to initial states. The resetting operation is performed in a second period of time which is the other of the period of time in which the potential of the common electrode corresponds to the first potential and the period of time in which the potential of the common electrode corresponds to the second potential is entered. With this configuration, even when the sensor lines are amplified due to the coupling capacitance with the common electrode, the detection circuit operates with original potentials. Accordingly, detection accuracy is prevented from being deteriorated.

The potentials of the sensor lines may be changed when the potential of the common electrode is changed. With this configuration, since the coupling capacitance between the sensor lines and the common electrode and the impedances of the sensor lines may be negligible, the versatility of arrangement features is improved and a small panel is obtained. The sensor lines may be short-circuited to the common electrode. In this case, the coupling capacitance may be ignored since the potentials of the sensor lines and the potential of the common electrode are equal to each other. The sensor lines may be connected to power supply lines which receive potentials supplied from an external device in the second period of time, and are brought to floating states in the first period of time. With this configuration, since the sensor lines are amplified due to the coupling capacitance generated using the sensor lines and the common electrode, a large amount of coupling capacitance generated between the sensor lines and the common electrode and large impedances of the sensor lines may be ignored.

The display device further may include first electrodes arranged in regions overlapped with the optical sensors in a plan view, and second electrodes arranged in regions in which the first electrodes are overlapped with the bus lines. With this configuration, when the first electrodes are arranged for shielding light, the optical sensors are barely influenced by potential changes of the bus lines (such as scanning lines and data lines) through the first electrodes. Accordingly, the detection accuracy is improved. The second electrodes may be connected to the common electrode. The common electrode has a small output impedance and a small line impedance in order to obtain high image quality. Accordingly, when the common electrode is used as a fixed potential for each of the second electrodes, shielding function is improved, unnecessary lines are eliminated. Accordingly, a small display device is obtained.

The first electrodes which overlapped with the optical sensors may function as a plurality of light-shielding electrodes for shielding backlight. The bus lines and the second electrodes may be arranged in gaps interposed among the plurality of light-shielding electrodes. Since the bus lines are arranged in the gaps when the backlight light-shielding electrodes are overlapped with the optical sensors, light is prevented from leaking and stray light is prevented from being emitted.

The plurality of sub regions may be arranged along a plurality of sides of the active matrix circuit. Since the optical sensors are arranged along the plurality of side, an amount of emitted stray light is barely varied in accordance with a display state of the liquid crystal display device. Furthermore, when a touch panel is employed in the display device and even when light is blocked by a finger for operation, the detection operation is normally performed.

The display device may further include a plurality of detection circuits, and a majority determination circuit connected to the plurality of detection circuits. The majority determination circuit changes an output signal when at least two of a plurality of results of detections output from the plurality of determination circuits are changed. With this configuration, when a shadow of a finger is formed on one of the plurality of sides or when a spotlight having a light intensity higher than external light encounters the one of the plurality of sides, a result of detection of the light intensity of the one of the plurality of sides is eliminated. Accordingly, the detection accuracy is improved. Furthermore, the plurality of detection circuits may include a first and a second detection circuits. Among the plurality of sub regions, sub regions connected to the first detection circuit among the plurality of detection circuits through the sensor lines may be arranged on one of the plurality of sides of the active matrix circuit, and sub regions connected to the second detection circuits among the plurality of detection circuits through the sensor lines may be arranged on one of the other remaining sides of the active matrix circuit. With this configuration, since a majority determination process is performed for the plurality of sides, even if a shadow is formed on a specific one of the plurality of sides or even if light having a high intensity is incident on a specific one of the plurality of sides, malfunction does not occur. Accordingly, external light is detected with high accuracy.

Moreover, the optical sensors may be PIN junction diodes or PN junction diodes formed of polysilicon thin films, and the driving circuits may include polysilicon thin film transistors. With this configuration, since the optical sensors and the thin-film transistors are formed in an identical fabrication process, the fabrication cost of the liquid crystal display device is prevented from increasing even when the optical sensors are incorporated in the liquid crystal display device.

According to another embodiment of the invention, there is provided an electronic apparatus including the display device. Since optical sensors having high detection accuracies are incorporated in the display device, an intensity of backlight can be readily controlled in accordance with external light. Accordingly, power consumption and fabrication cost is prevent from increasing. Furthermore, since photosensors may be arranged near a display region, the versatility of design features is improved.

BRIEF DESCRIPTION OF THE DRAWINGS

The invention will be described with reference to the accompanying drawings, wherein like numbers reference like elements.

FIG. 22 is a timing chart according to the third embodiment of the invention.

DESCRIPTION OF EXEMPLARY EMBODIMENTS

Embodiments of the present invention will be described hereinafter with reference to the accompanying drawings.

First Embodiment

Figure 1:
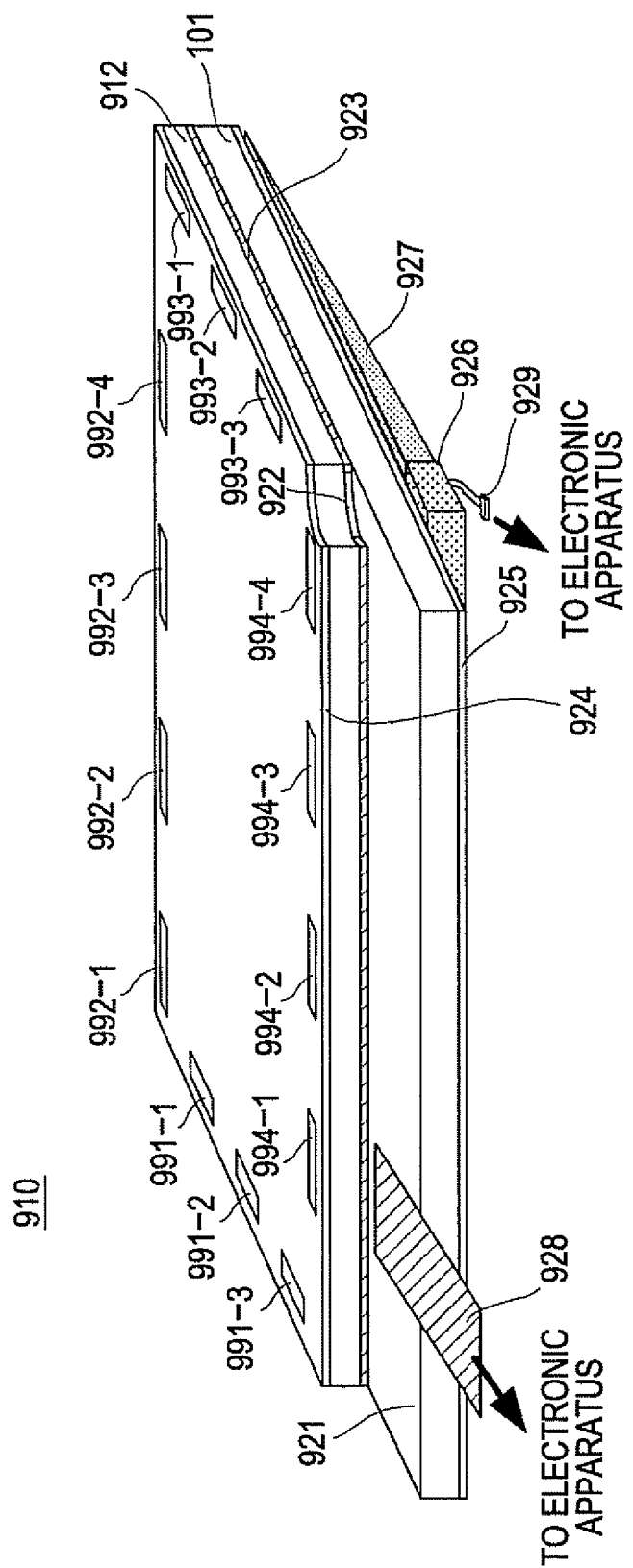
FIG. 1 is a perspective view illustrating a liquid crystal display device according to a first embodiment of the present invention.

FIG. 1 is a perspective view (partial sectional view) illustrating a liquid crystal display device 910 according to a first embodiment of the present invention. The liquid crystal display device 910 includes an active matrix substrate 101, a counter substrate 912 attached to the active matrix substrate 101 using a seal member 923 with a predetermined gap therebetween, and nematic-phase liquid crystal material 922 interposed between the active matrix substrate 101 and the counter substrate 912. Furthermore, although not shown, alignment material formed of polyimide, for example, is applied onto the active matrix substrate 101 and is subjected to rubbing processing so as to obtain an alignment film on the active matrix substrate 101. The counter substrate 912 includes color filters (not shown) corresponding to pixels, a black matrix 940 (refer to FIG. 6, for example) which is formed of resin having a low reflection characteristic and low transmissivity which prevents light from being transmitted so as to improve contrast, and a counter electrode 930 (refer to FIG. 2, for example) serving as a common electrode which is formed of an ITO (indium tin oxide) film and which is short-circuited to a counter conductive portion 330 (330-1 and 330-2 shown in FIG. 2, for example) disposed on the active matrix substrate 101. Furthermore, alignment material formed of polyimide, for example, is applied onto a surface of the counter substrate 912 and is subjected to rubbing processing perpendicular to a direction in which the alignment film on the active matrix substrate 101 is subjected to the rubbing processing.

Furthermore, an upper polarizing plate 924 is disposed outside the counter substrate 912, and a lower polarizing plate 925 is disposed outside the active matrix substrate 101 so that a polarization direction of the upper polarizing plate 924 and a polarization direction of the lower polarizing plate 925 are perpendicular to each other (a crossed-Nicol state). Furthermore, a backlight unit 926 and a light-guide plate 927 are disposed under the lower polarizing plate 925. The backlight unit 926 emits light toward the light-guide plate 927, and the light-guide plate 927 functions as a surface light source of the liquid crystal display device 910 by reflecting and refracting the light emitted from the backlight unit 926 so that the light is perpendicularly and uniformly incident onto the active matrix substrate 101. Although an LED (light emitting diode) unit is employed as the backlight unit 926 in this embodiment, a CCFL (cold cathode fluorescent lamp) may be employed. The backlight unit 926 is connected to an electronic apparatus body through a connecter 929 so as to receive electric power. In this embodiment, the light emitted from the backlight unit 926 is controlled by appropriately controlling current and voltage of the electric power.

Although not shown, the liquid crystal display device 910 may be covered with a case, a glass plate or a an acrylic plate may be disposed on the upper polarizing plate 924, and an optical compensation film may be attached to the upper polarizing plate 924 so as to attain a wide viewing angle, as needed.

The active matrix substrate 101 further includes an extending portion 921 which projects from the counter substrate 912 and which includes signal input terminals 320 (refer to FIG. 2, for example) disposed thereon. The signal input terminals 320 are electrically connected to an FPC (flexible printed circuit) 928 which is a flexible board mounted on the active matrix substrate 101. The FPC 928 is connected to the electronic apparatus body, and receives electric power and control signals, for example, as needed.

Moreover, a first first-side light-receiving opening 991-1 to a third first-side light-receiving opening 991-3, a first second-side light-receiving opening 992-1 to a fourth second-side light-receiving opening 992-4, a first third-side light-receiving opening 993-1 to a third third-side light-receiving opening 993-3, and a first fourth-side light-receiving opening 994-1 to a fourth fourth-side light-receiving opening 994-4 are formed on the liquid crystal display device 910 by partially removing the black matrix 940 on the counter substrate 912. External light is incident through these openings onto the active matrix substrate 101.

Figure 2:
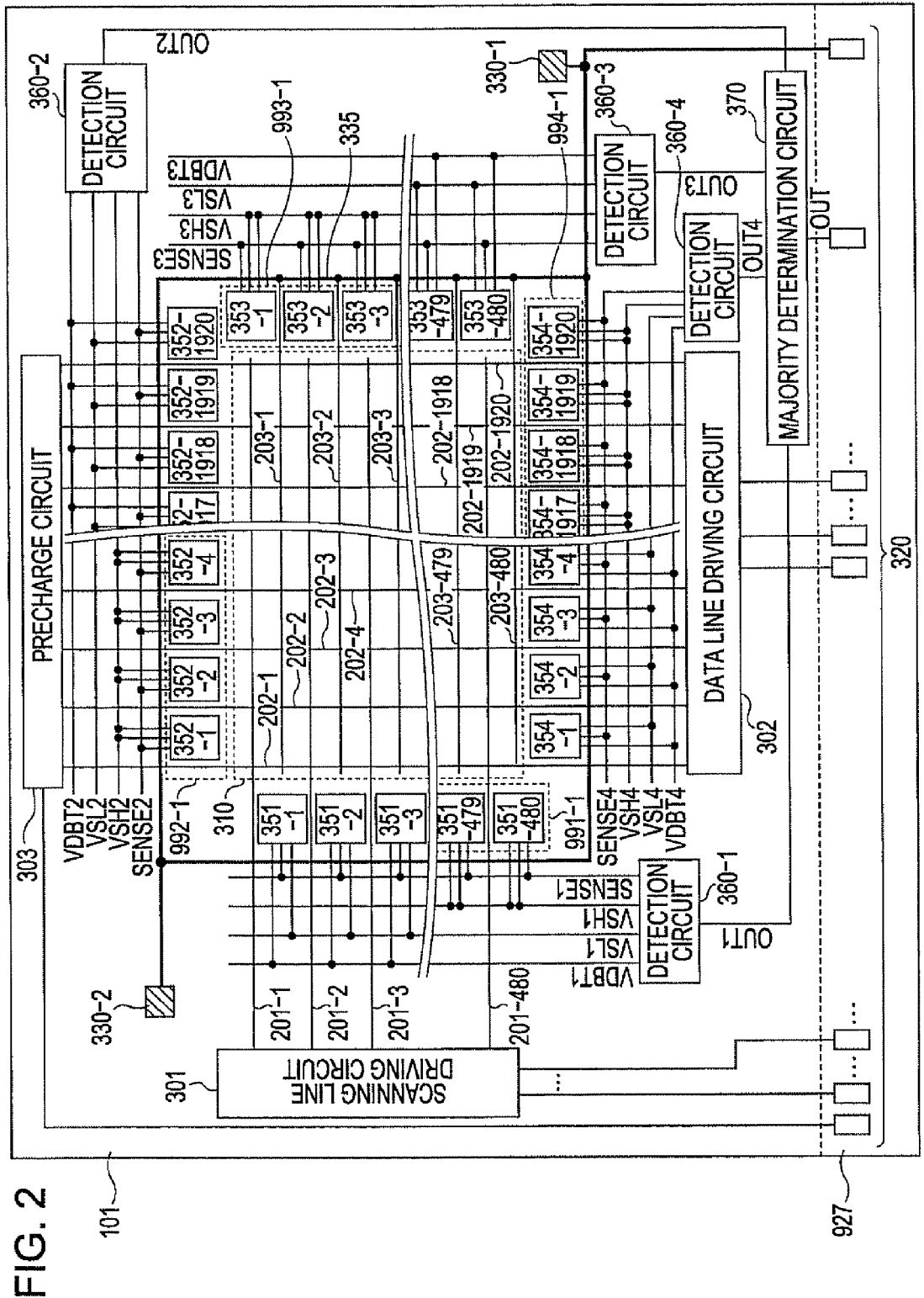
FIG. 2 is a diagram illustrating a configuration of an active matrix substrate according to the first embodiment of the invention.

FIG. 2 is a diagram illustrating a configuration of the active matrix substrate 101. The active matrix substrate 101 includes a display region 310 which has 480 scanning lines 201 (201-1 to 201-480), 1920 data lines 202 (202-1 to 202-1920) intersecting with the scanning lines 201 (201-1 to 201-480), and 480 capacitor lines 203 (203-1 to 203-480) arranged in parallel to the scanning lines 201 (201-1 to 201-480). The capacitor lines 203 (203-1 to 203-480) are short-circuited to each other and connected to a common potential line 335. The capacitor lines 203 (203-1 to 203-480) are further connected to two counter conduction portions 330 (330-1 and 330-2) so as to receive common potentials which are represented by inversion signals having voltages ranging from 0V to 5V each having inversion period of 35 μsec and which are supplied from the signal input terminals 320. The scanning lines 201 (201-1 to 201-480) are connected to a scanning line driving circuit 301, and the data lines 202 (202-1 to 202-1920) are connected to a data line driving circuit 302 and a precharge circuit 303 so as to be appropriately driven. The scanning line driving circuit 301, the data line driving circuit 302, and the precharge circuit 303 receive signals required for driving operations thereof. The signal input terminals 320 are disposed on the extending portion 921. The scanning line driving circuit 301, the data line driving circuit 302, and the precharge circuit 303 are formed by depositing polysilicon thin film transistors on the active matrix substrate 101, and are each fabricated in a process of forming switching elements 401 (401-$n$-$m$), which will be described later. Accordingly, a so-called driving-circuit incorporating liquid crystal display device is obtained.

Furthermore, 480 first-side optical sensors 351-1 to 351-480 are interposed as optical sensors 351 between the scanning line driving circuit 301 and the display region 310. For example, an n-th first-side optical sensor 351-$n$ is arranged in a region between a scanning line 201-$n$ and a scanning line 201-$n$+1. Here, the 81st first-side optical sensor 351-81 to the 160th first-side optical sensor 351-160 are arranged beneath the first first-side light-receiving opening 991-1, the 241st first-side optical sensor 351-241 to the 320th first-side optical sensor 351-320 are arranged beneath the second first-side light-receiving opening 991-2, and the 401st first-side optical sensor 351-401 to the 480th first-side optical sensor 351-480 are arranged beneath the third first-side light-receiving opening 991-3. These first-side optical sensors 351-$n$ which are arranged beneath any one of the first first-side light-receiving opening 991-1 to the third first-side light-receiving opening 991-3 are collectively referred to as a first-side light-receiving sensor group. In addition, the remaining first-side optical sensors 351-$n$ which are not arranged beneath any one of the first first-side light-receiving opening 991-1 to the third first-side light-receiving opening 991-3 are collectively referred to as a first-side light-shielding sensor group.

Similarly, 1920 second-side optical sensors 352-1 to 352-1920 are interposed as optical sensors 352 between the precharge circuit 303 and the display region 310. For example, an n-th second-side optical sensor 352-*n* is arranged in a region between a data line 202-*n* and a data line 202-*n*+1. Here, the first second-side optical sensor 352-1 to the 240th second-side optical sensor 352-240 are arranged beneath the first second-side light-receiving opening 992-1, the 481st second-side optical sensor 352-481 to the 720th second-side optical sensor 352-720 are arranged beneath the second second-side light-receiving opening 992-2, the 961st second-side optical sensor 352-961 to the 1200th second-side optical sensor 352-120 are arranged beneath the third second-side light-receiving opening 992-3, and the 1441st second-side optical sensor 352-1441 to the 1680th second-side optical sensor 352-1680 are arranged beneath the fourth second-side light-receiving opening 992-4. These second-side optical sensors 352-*n* which are arranged beneath any one of the first second-side light-receiving opening 992-1 to the fourth second-side light-receiving opening 992-4 are collectively referred to as a second-side light-receiving sensor group. In addition, the remaining second-side optical sensors 352-*n* which are not arranged beneath any one of the first second-side light-receiving opening 992-1 to the fourth second-side light-receiving opening 992-4 are collectively referred to as a second-side light-shielding sensor group.

Similarly, 480 third-side optical sensors 353-1 to 353-480 are arranged as optical sensors 353 in a periphery portion opposing the scanning line driving circuit 301 relative to the display region 310. For example, an n-th third-side optical sensor 353-*n* is arranged in a region between a capacitor line 203-*n* and a capacitor line 203-*n*−1. Here, the first third-side optical sensor 353-1 to the 80th third-side optical sensor 353-80 are arranged beneath the first third-side light-receiving opening 993-1, the 161st third-side optical sensor 353-161 to the 240th third-side optical sensor 353-240 are arranged beneath the second third-side light-receiving opening 993-2, and the 321st third-side optical sensor 353-321 to the 400th third-side optical sensor 353-400 are arranged beneath the third third-side light-receiving opening 993-3. These third-side optical sensors 353-*n* which are arranged beneath any one of the first third-side light-receiving opening 993-1 to the third third-side light-receiving opening 993-3 are collectively referred to as a third-side light-receiving sensor group. In addition, the remaining third-side optical sensors 353-*n* which are not arranged beneath any one of the first third-side light-receiving opening 993-1 to the third third-side light-receiving opening 993-3 are collectively referred to as a third-side light-shielding sensor group.

Similarly, 1920 fourth-side optical sensors 354-1 to 354-1920 are interposed as optical sensors 354 between the data line driving circuit 302 and the display region 310. For example, an n-th fourth-side optical sensor 354-*n* is arranged in a region between a data line 202-*n* and a data line 202-*n*+1. Here, the 241st fourth-side optical sensor 354-241 to the 480th fourth-side optical sensor 354-480 are arranged beneath the first fourth-side light-receiving opening 994-1, the 721st fourth-side optical sensor 354-721 to the 960th fourth-side optical sensor 354-960 are arranged beneath the second fourth-side light-receiving opening 994-2, the 1201st fourth-side optical sensor 354-1201 to the 1440th fourth-side optical sensor 354-1440 are arranged beneath the third fourth-side light-receiving opening 994-3, and the 1681st fourth-side optical sensor 354-1681 to the 1920th fourth-side optical sensor 354-1920 are arranged beneath the fourth fourth-side light-receiving opening 994-4. These fourth-side optical sensors 354-*n* which are arranged beneath any one of the first fourth-side light-receiving opening 994-1 to the fourth fourth-side light-receiving opening 994-4 are collectively referred to as a fourth-side light-receiving sensor group. In addition, the remaining fourth-side optical sensors 354-*n* which are not arranged beneath any one of the first fourth-side light-receiving opening 994-1 to the fourth fourth-side light-receiving opening 994-4 are collectively referred to as a fourth-side light-shielding sensor group.

The first-side light-receiving sensor group is connected to a line SENSE (SENSE1) and a line VSH (VSH1). The first-side light-shielding sensor group is connected to the line SENSE1, a line VSL (VSL1), and a line VDBT (VDBT1). The second-side light-receiving sensor group is connected to a line SENSE (SENSE2) and a line VSH (VSH2). The second-side light-shielding sensor group is connected to the line SENSE2, a line VSL (VSL2), and a line VDBT (VDBT2). The third-side light-receiving sensor group is connected to a line SENSE (SENSE3) and a line VSH (VSH3). The third-side light-shielding sensor group is connected to the line SENSE3, a line VSL (VSL3), and a line VDBT (VDBT3). The fourth-side light-receiving sensor group is connected to a line SENSE (SENSE4) and a line VSH (VSH4). The fourth-side light-shielding sensor group is connected to the line SENSE4, a line VSL (VSL4), and a line VDBT (VDBT4).

The line SENSE1, the line VSH1, the line VSL1, and the line VDBT1 are connected to a first detection circuit 360-1 among detection circuits 360. The line SENSE2, the line VSH2, the line VSL2, and the line VDBT2 are connected to a second detection circuit 360-2 among the detection circuits 360. The line SENSE3, the line VSH3, the line VSL3, and the line VDBT3 are connected to a third detection circuit 360-3 among the detection circuits 360. The line SENSE4, the line VSH4, the line VSL4, and the line VDBT4 are connected to a fourth detection circuit 360-4 among the detection circuits 360.

An output line OUT1 connected to the first detection circuit 360-1 at one end thereof, an output line OUT2 connected to the second detection circuit 360-2 at one end thereof, an output line OUT3 connected to the third detection circuit 360-3 at one end thereof, and an output line OUT4 connected to the fourth detection circuit 360-4 at one end thereof are connected to a majority determination circuit 370 at the other ends thereof. An output line OUT connected to the majority determination circuit 370 at one end thereof is connected to an external circuit at the other end thereof through one of the signal input terminals 320.

Figure 3:
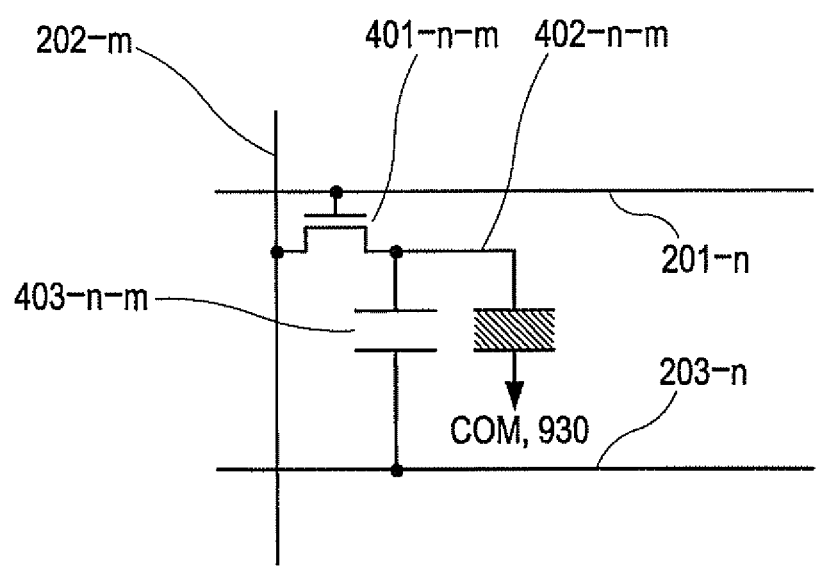
FIG. 3 is a diagram illustrating a pixel circuit of the active matrix substrate according to the first embodiment of the invention.

FIG. 3 is a circuit diagram illustrating a portion in which an m-th data line 202-*m* intersects an n-th scanning line 201-*n* and the vicinity thereof included in the display region 310. A pixel switching element 401-*n-m* formed of an N-channel field-effect polysilicon thin-film transistor is arranged in an intersection of the n-th scanning line 201-*n* and the m-th data line 202-*m*. A gate electrode of the pixel switching element 401-*n-m* is connected to a scanning line 201-*n*, and a source and a drain electrodes are connected to a data line 202-*m* and a pixel electrode 402-*n-m* included in pixel electrodes 402, respectively. The pixel electrode 402-*n-m* and an electrode which is short-circuited to the pixel electrode 402-*n-m* and which has a potential the same as that of the pixel electrode 402-*n-m* constitute an auxiliary capacitor 403-*n-m* included in auxiliary capacitors 403 along with a capacitor line 203-*n*. Furthermore, when a liquid crystal display device is assembled, the pixel electrode 402-*n-m* and the electrode constitute a capacitor along with the counter electrode 930 with liquid crystal elements interposed therebetween.

Figure 4:
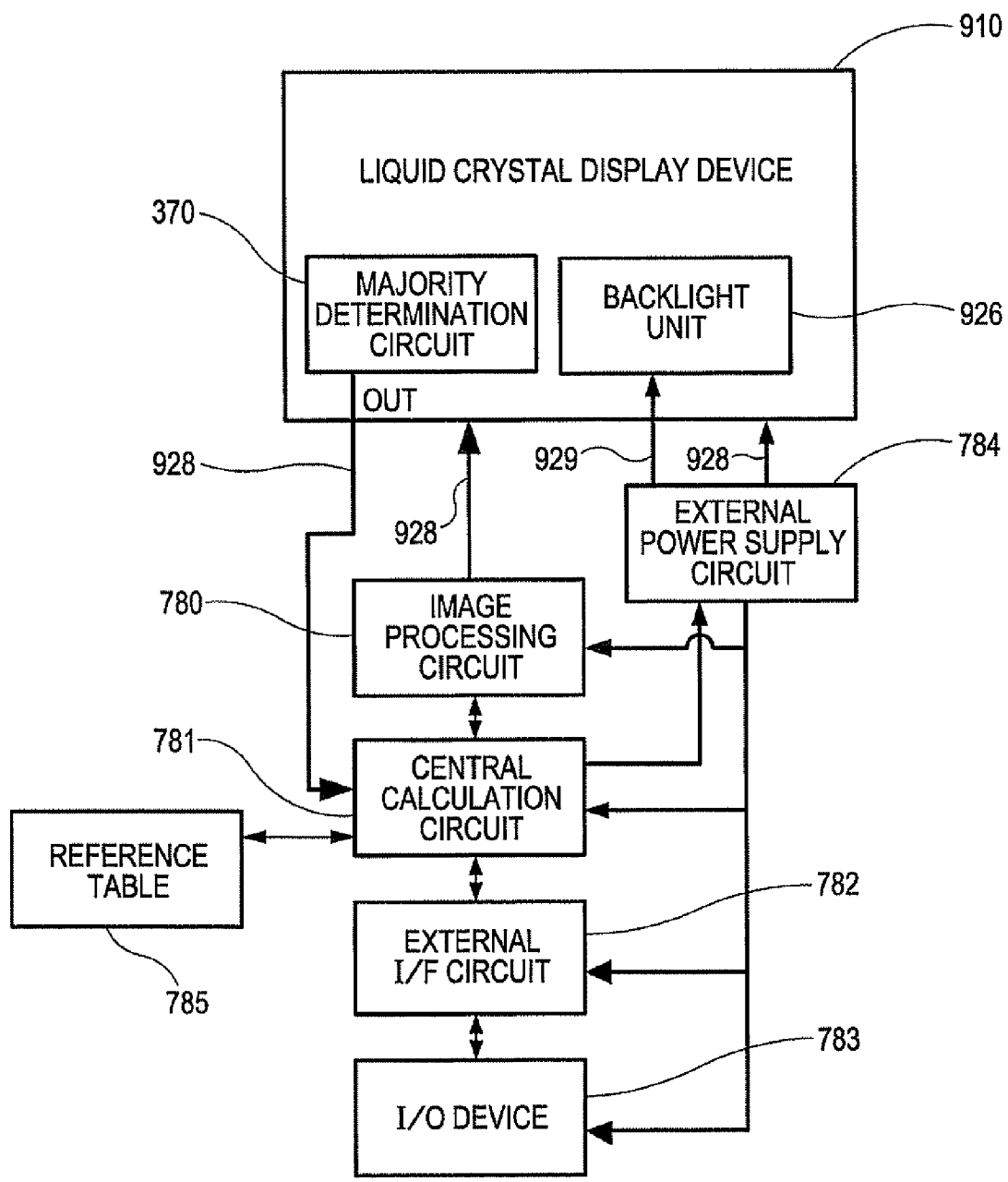
FIG. 4 is a block diagram illustrating an electronic apparatus according to the first embodiment of the invention.

FIG. 4 is a block diagram illustrating a configuration of an electronic apparatus according to the first embodiment. The configuration of the liquid crystal display device 910 in this electronic apparatus has been described with reference to FIG. 1. An external power supply circuit 784 and an image processing circuit 780 supply electric power and signals to the liquid crystal display device 910 as needed through the FPC 928, which is the flexible board, and the connecter 929. A central calculation circuit 781 obtains data supplied through an external I/F (interface) circuit 782 from an input/output device 783. Examples of the input/output device 783 include a keyboard, a mouse, a trackball, an LED, a speaker, and an antenna. The central calculation circuit 781 performs various calculation processes using data externally supplied and supplies results of the calculation processes as commands to the image processing circuit 780 or the external I/F circuit 782. The image processing circuit 780 updates image information in accordance with a command supplied from the central calculation circuit 781 so as to change a signal to be supplied to the liquid crystal display device 910, and accordingly, an image displayed in the liquid crystal display device 910 is changed. The majority determination circuit 370 included in the liquid crystal display device 910 supplies a signal through the output line OUT and the FPC 928 to the central calculation circuit 781, and the central calculation circuit 781 converts a pulse length of the signal which is a binary output signal (OUT) into a discrete value. Then, the central calculation circuit 781 uses a reference table 785 included in an EEPROM (electronically erasable and programmable read-only memory), further converts the discrete value into a value corresponding to a voltage of the backlight unit 926, and transmits the converted value to the external power supply circuit 784. The external power supply circuit 784 supplies through the connecter 929 electric power having a voltage corresponding to the transmitted value to the backlight unit 926 included in the liquid crystal display device 910. Since luminance of the backlight unit 926 depends on a voltage supplied from the external power supply circuit 784, the luminance of the liquid crystal display device 910 is changed even at a time of overall white display. Examples of the electronic apparatus include a monitor, a television set, a laptop computer, a PDA (personal digital (data) assistants), a digital still camera, a video camera, a cellular phone, a portable photo viewer, a portable video player, a portable DVD (digital versatile disc) player, and a portable audio player.

Note that, in this embodiment, the luminance of the backlight unit 926 is controlled using the central calculation circuit 781 included in the electronic apparatus. However, a driver IC and an EEPROM may be included in the liquid crystal display device 910 and the driver IC may have a function of converting a binary output signal into a discrete value, a function of further converting the discrete value with reference to the EEPROM, and a function of controlling a voltage to be supplied to the backlight unit 926. Alternatively, the discrete value may be converted by numeric calculation into a value corresponding to a voltage of the backlight unit 926 instead of utilization of the reference table.

Figure 5:
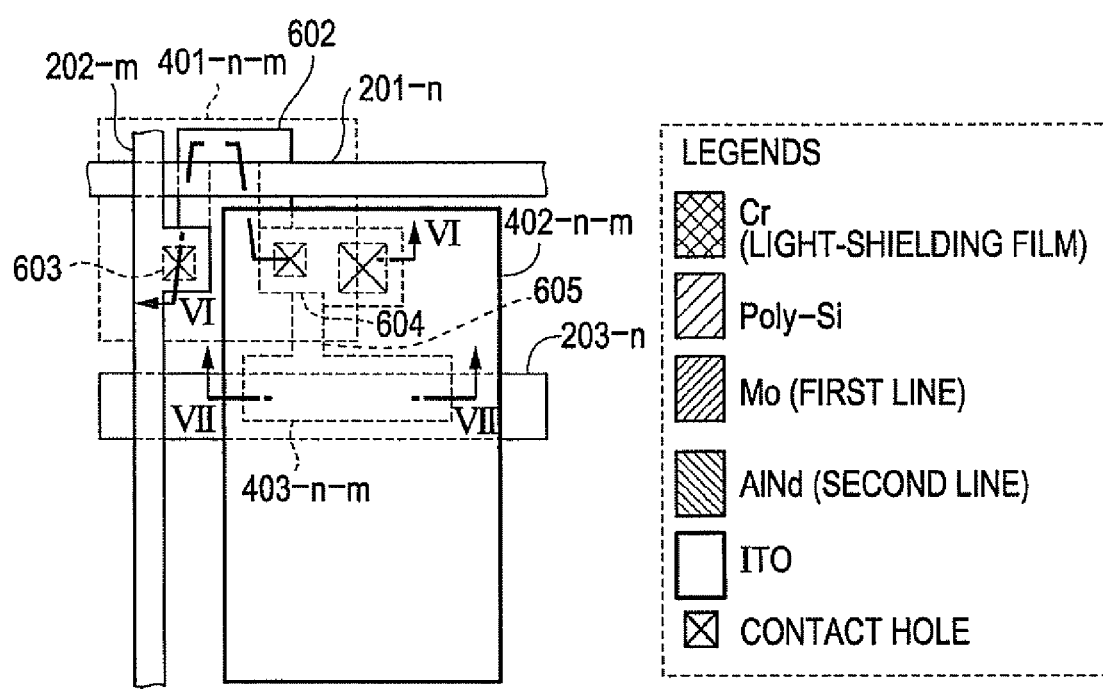
FIG. 5 is a plan view illustrating a pixel unit included in the active matrix substrate according to the first embodiment of the invention.

FIG. 5 is a plan view illustrating a configuration of the circuit diagram of the display region 310 shown in FIG. 3 in practical use. As is apparent from an explanatory note shown in FIG. 5, different hatchings denote different material members used for lines, and identical hatchings denote identical material members used for lines. The display region 310 includes five films, that is, a chromium (Cr) thin film, a polysilicon (Poly-Si) thin film, a molybdenum (Mo) thin film, a thin film of an alloy of aluminum and neodymium (AlNd), and an indium tin oxide (ITO) thin film. Furthermore, insulating films formed by depositing silicon oxide, silicon nitride, or an organic insulating film, or a combination thereof are interposed among the films. Specifically, the chromium (Cr) thin film having a film thickness of 100 nm, the polysilicon (Poly-Si) thin film having a film thickness of 50 nm, the molybdenum (Mo) thin film having a film thickness of 200 nm, the thin film of an alloy of aluminum and neodymium (AlNd) having a film thickness of 500 nm, and the indium tin oxide (ITO) thin film having a film thickness of 100 nm are included in the display region 310. Furthermore, an underlying insulating film formed by depositing a silicon nitride film having a film thickness of 100 nm and a silicon oxide film having a film thickness of 100 nm is arranged between the chromium (Cr) thin film and the polysilicon (Poly-Si) thin film, a gate insulating film formed of a silicon oxide film having a film thickness of 100 nm is arranged between the polysilicon (Poly-Si) thin film and the molybdenum (Mo) thin film, an interlayer insulating film formed by depositing a silicon nitride film having a film thickness of 200 nm and a silicon oxide film having a film thickness of 500 nm is arranged between the molybdenum (Mo) thin film and the thin film of an alloy of aluminum and neodymium (AlNd), and a protection insulating film formed by depositing a silicon nitride film having a film thickness of 200 nm and an organic planarizing film having an average film thickness of 1 μm is arranged between the thin film of an alloy of aluminum and neodymium (AlNd) and the indium tin oxide (ITO) thin film. With this configuration, the lines are insulated from one another, but connected to one another using contact holes arranged in appropriate positions. Note that a chromium (Cr) thin film pattern is not shown in FIG. 5.

As shown in FIG. 5, the data line 202-*m* is formed of the thin film of an alloy of aluminum and neodymium (AlNd) and is connected to the source electrode of the pixel switching element 401-*n*-*m* through a contact hole. The scanning line 201-*n* is formed of the molybdenum (Mo) thin film and uses the gate electrode of the pixel switching element 401-*n*-*m* in common. The capacitor line 203-*n* is formed of material the same as that of the scanning line 201-*n*. The pixel electrode 402-*n*-*m* is formed of the indium tin oxide (ITO) thin film and is connected to the drain electrode of the pixel switching element 401-*n*-*m* through a contact hole. The drain electrode of the pixel switching element 401-*n*-*m* is also connected to a capacitor electrode 605 formed of an n+ polysilicon thin film to which phosphorus is highly doped so that the capacitor electrode 605 is overlapped with the capacitor line 203-*n* in plan view so as to constitute the auxiliary capacitor 403-*n*-*m*.

Figure 6:
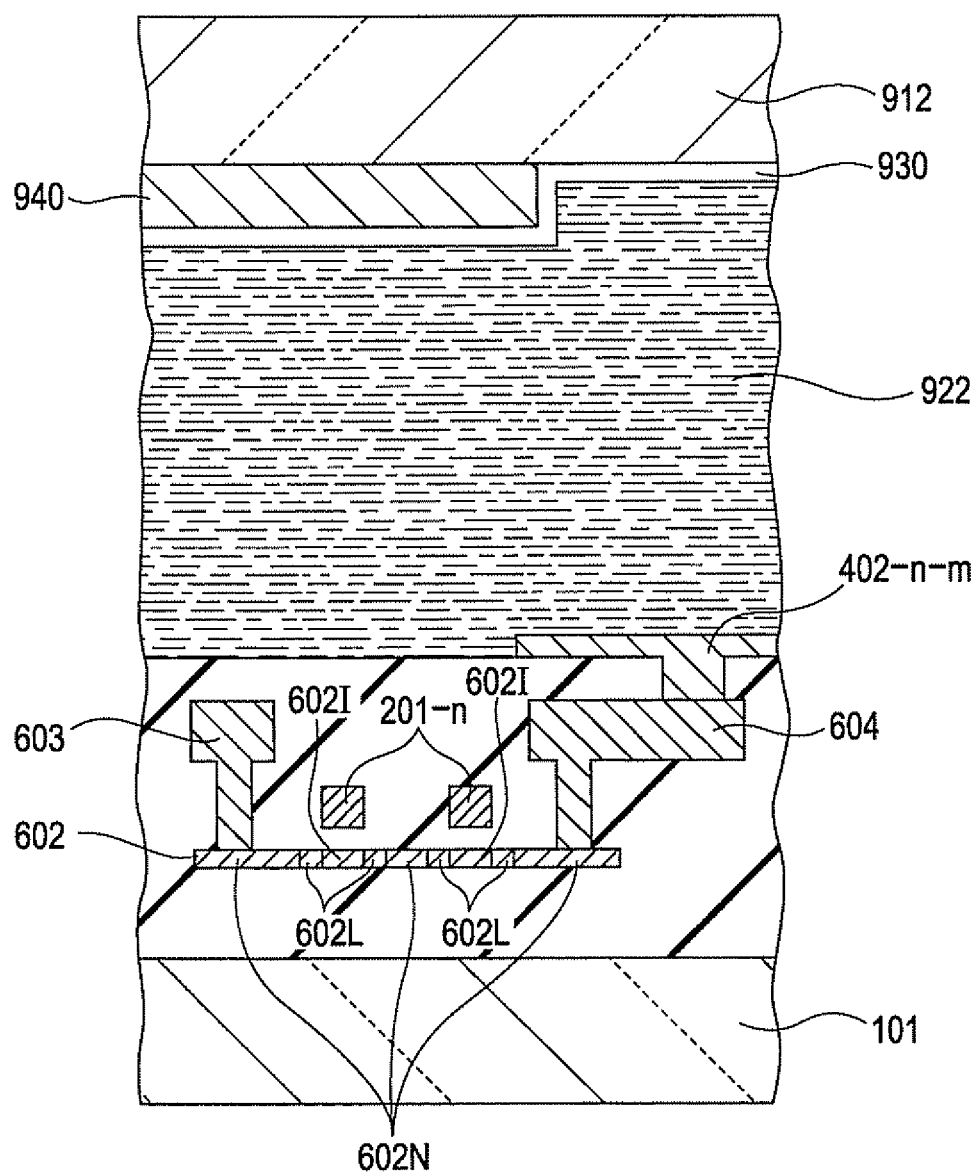
FIG. 6 is a sectional view taken along a line VI-VI' shown in FIG. 5.

FIG. 6 is a partial sectional view of the liquid crystal display device 910 taken along a line VI-VI' shown in FIG. 5. In FIG. 6, a configuration of the pixel switching element 401-*n*-*m* is illustrated. Note that components are not precisely shown in scale for convenience of explanation. The active matrix substrate 101 is an insulating substrate formed of an alkali-free glass having a thickness of 0.6 mm. A silicon island 602 formed of a polysilicon thin film is arranged over the active matrix substrate 101 through an underlying insulating film formed by depositing a silicon nitride film having a film thickness of 200 nm and a silicon oxide film having a film thickness of 300 nm. The scanning line 201-*n* is arranged above the active matrix substrate 101 so that the silicon island 602 and the gate insulating film described above are interposed therebetween. An intrinsic semiconductor region 602I included in the silicon island 602 which is overlapped with the scanning line 201-*n* includes phosphorus ion which is not doped or includes lightly-doped phosphorus ion. The intrinsic semiconductor region 602I is sandwiched between a pair of n− regions 602L which have sheet resistances of 20 kΩ and which include lightly-doped phosphorus ion, and further sandwiched between left and right n+ regions 602N which have sheet resistances of 1 kΩ, which include highly-doped phosphorus ion, and which are arranged outside the pair of n− regions 602L. Accordingly, pixel switching element 401-*n-m* has an LDD (lightly-doped drain) structure. The left and right n+ regions 602N are connected through a contact hole to a source electrode 603 and a drain electrode 604. Furthermore, the source electrode 603 is connected to the data line 202-*m*, and the drain electrode 604 is connected to the pixel electrode 402-*n-m*. The nematic-phase liquid crystal material 922 is interposed between the pixel electrode 402-*n-m* and the counter electrode 930 which serves as a common electrode and which is arranged on the counter substrate 912. Moreover, the black matrix 940 is arranged on the counter substrate 912 so as to be partially overlapped with the pixel electrode 402-*n-m*. Note that, in a case where light-leakage current of the pixel switching element 401-*n-m* causes a problem, a configuration in which a light-shielding layer formed of a Cr film is arranged on a lower side of the silicon island 602 may be employed. However, since mobility of the pixel switching element 401-*n-m* is deteriorated with this configuration and an amount of the light-leakage current is negligible in this embodiment, the Cr film is not arranged on the lower side of the silicon island 602.

Figure 7:
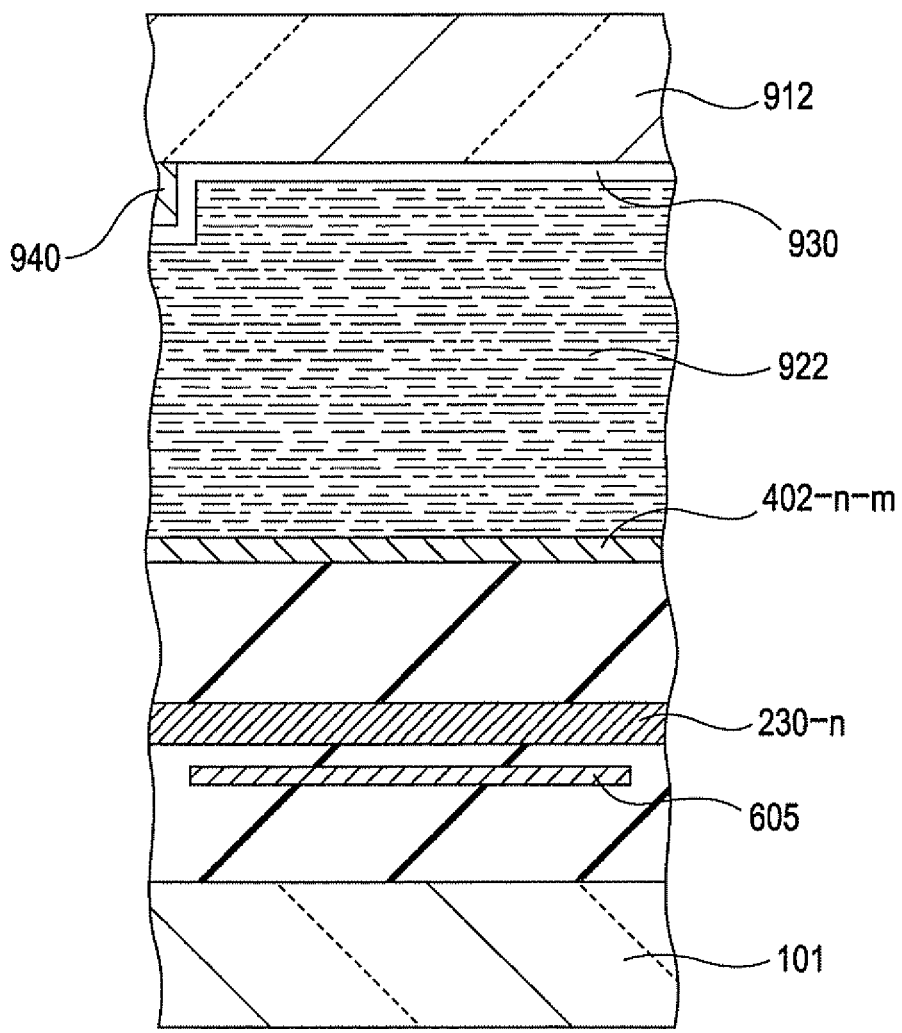
FIG. 7 is a sectional view taken along a line VII-VII' shown in FIG. 5.

FIG. 7 is a partial sectional view of the liquid crystal display device 910 taken along a line VII-VII' shown in FIG. 5. In FIG. 7, a configuration of the auxiliary capacitor 403-*n-m* is illustrated. The gate insulating film is sandwiched between the capacitor electrode 605 connected to the drain electrode 604 and the capacitor line 203-*n* whereby a storage capacitor is formed.

Figure 8:
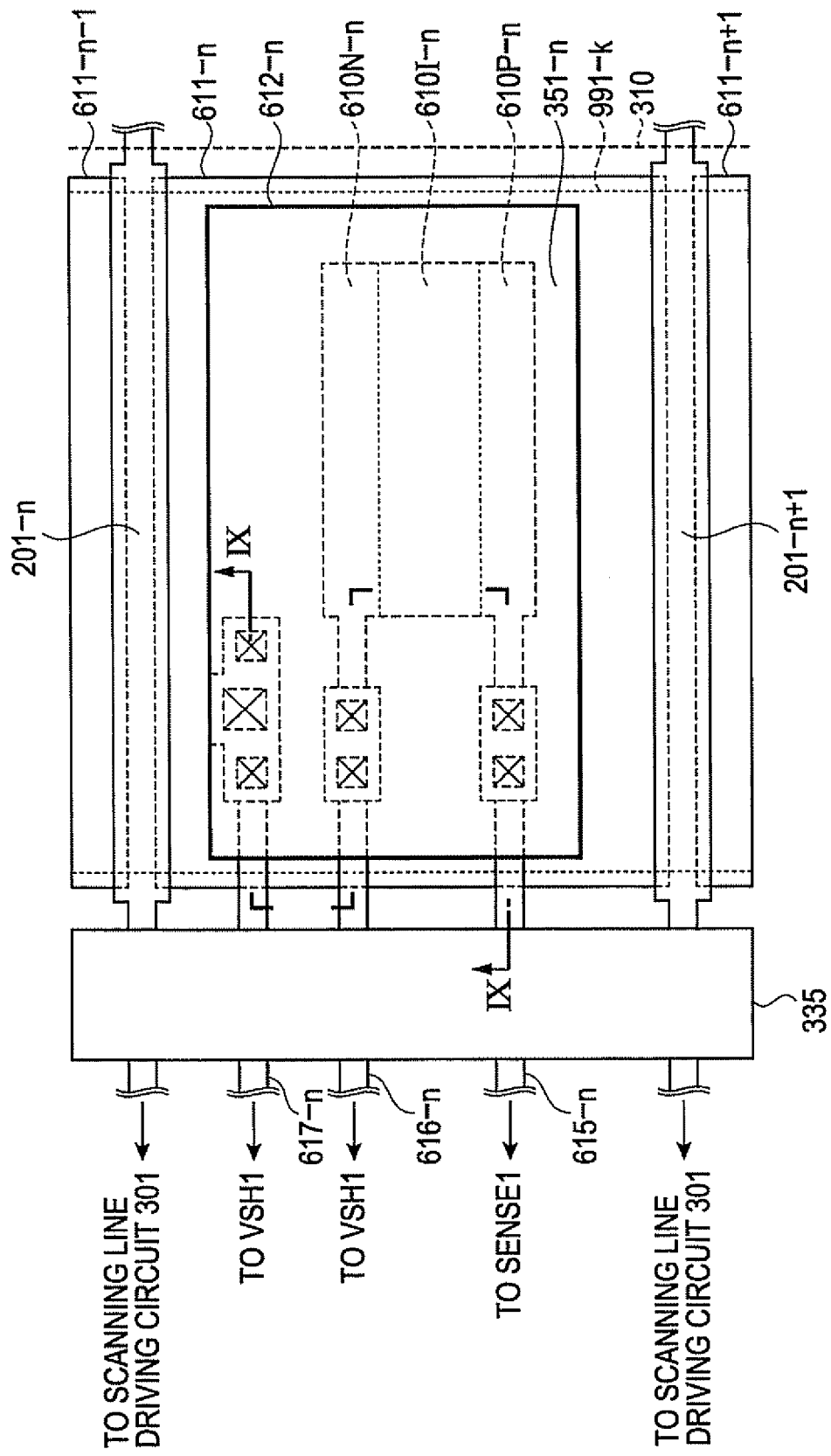
FIG. 8 is an enlarged plan view illustrating an n-th first-side optical sensor included in a first-side light-receiving sensor group according to the first embodiment of the invention.
Figure 9:
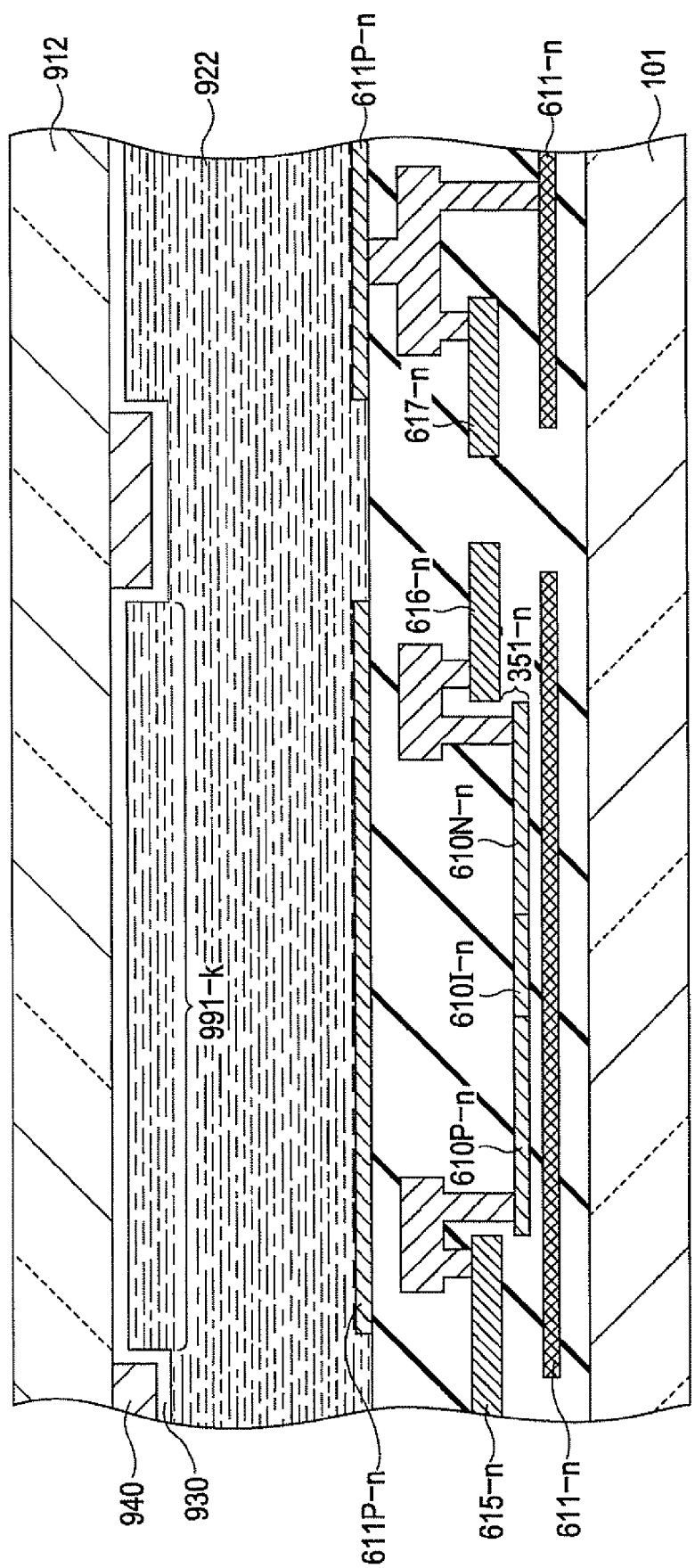
FIG. 9 is a sectional view taken along a line IX-IX shown in FIG. 8.

FIG. 8 is an enlarged plan view illustrating an n-th first-side optical sensor 351-*n* included in the first-side light-receiving sensor group. The explanatory note shown in FIG. 5 is also employed in FIG. 8. FIG. 9 is a partial sectional view of the liquid crystal display device 910 taken along a line IX-IX shown in FIG. 8. The n-th first-side optical sensor 351-*n* includes an anode region 610P (610P-n), an intrinsic region 610I (610I-n), and a cathode region 610N (610N-n). Each of the anode region 610P-n, the intrinsic region 610I-n, and the cathode region 610N-n is formed by appropriately performing impurity injection on an island pattern formed of a polysilicon (Poly-si) thin film which is identical with the polysilicon (Poly-si) thin film for the pixel switching element 401-*n-m*. Specifically, boron ion is injected into the anode region 610P-n in high concentration so as to obtain a sheet resistance of approximately 2 kΩ, and phosphorus ion is injected into the cathode region 610N-n in high concentration so as to obtain a sheet resistance of approximately 1 kΩ. On the other hand, a negligibly small amount of boron ion and phosphorus ion are injected or boron ion and phosphorus ion are not injected into the intrinsic region 610I-n so that an intrinsic semiconductor is obtained. Accordingly, the n-th first-side optical sensor 351-*n* is a lateral PIN junction diode. The intrinsic region 610I-n has a length of 100 μm in a direction parallel to a junction surface and 10 μm in a direction perpendicular to the junction surface.

The n-th first-side optical sensor 351-*n* is entirely overlapped with a light-shielding electrode 611-*n* included in light-shielding electrodes 611 formed of a chromium (Cr) thin film and a transparent shielding electrode 612-*n* included in transparent shielding electrodes 612 formed of an ITO (indium tin oxide) film which is identical with the ITO (indium tin oxide) film for the pixel electrode 402-*n-m*. The light-shielding electrode 611-*n* functions as a light-shielding film so as to prevent light emitted from the backlight unit 926 from being incident on the n-th first-side optical sensor 351-*n*. The transparent shielding electrode 612-*n* prevents deterioration of accuracy of detection of a light intensity due to electromagnetic noise. The n-th first-side optical sensor 351-*n* is overlapped with a k-th first-side light-receiving opening 991-*k*. Since, in the k-th first-side light-receiving opening 991-*k*, the black matrix 940 arranged on the counter substrate 912 is removed, external light encounters n-th first-side optical sensors 351-*n* through the k-th first-side light-receiving opening 991-*k*. Here, "k" is a number corresponding to "n", that is, "k=1" corresponds to "n=81 to 160", "k=2" corresponds to "n=241 to 320", and "k=3" corresponds to "n=401 to 480".

The anode region 610P-n is connected to an anode electrode 615-*n* included in anode electrodes 615 through a contact hole. The cathode region 610N-n is connected to a cathode electrode 616-*n* included in cathode electrodes 616 through a contact hole. The light-shielding electrode 611-*n* and the transparent shielding electrode 612-*n* are connected to a BT electrode 617-*n* included in BT electrodes 617 through a contact hole. Although not shown, the anode electrode 615-*n* is further connected to the line SENSE1, and the cathode electrode 616-*n* and the BT electrode 617-*n* are connected to the line VSH1.

Note that an n'-th first-side optical sensor 351-*n*' included in the first-side light-shielding sensor group has a configuration similar to the n-th first-side optical sensor 351-*n* except that the n'-th first-side optical sensor 351-*n*' is not overlapped with the k-th first-side light-receiving opening 991-*k*, an anode electrode 615-*n*' is connected to the line VSL1, a cathode electrode 616-*n*' is connected to the line SENSE1, and a BT electrode 617-*n*' is connected to the line VDBT1. Therefore, description of the n'-th first-side optical sensor 351-*n*' is omitted.

Note that, in this embodiment, the light-shielding electrode 611-*n* and the transparent shielding electrode 612-*n* are separately formed in an isolated manner so that a gap is generated therebetween. However, in portions other than portions in which the first-side light-receiving sensor group and the first-side light-shielding sensor group are adjacent to each other, that is, other than a portion between the first-side optical sensor 351-80 and the first-side optical sensor 351-81, a portion between the first-side optical sensor 351-160 and the first-side optical sensor 351-161, a portion between the first-side optical sensor 351-240 and the first-side optical sensor 351-241, a portion between the first-side optical sensor 351-320 and the first-side optical sensor 351-321, and a portion between the first-side optical sensor 351-400 and the first-side optical sensor 351-401, the light-shielding electrode 611-*n* and the transparent shielding electrode 612-*n* may be short-circuited to each other since the light-shielding electrode 611-*n* and the transparent shielding electrode 612-*n* have identical potentials in the portions. In any case, stray light is prevented from being emitted from the gap generated between the light-shielding electrode 611-*n* and the transparent shielding electrode 612-*n* by covering the gap using a metal electrode as described in this embodiment. A bus line is preferably used as the metal electrode so that a small circuit area is attained.

Figure 10:
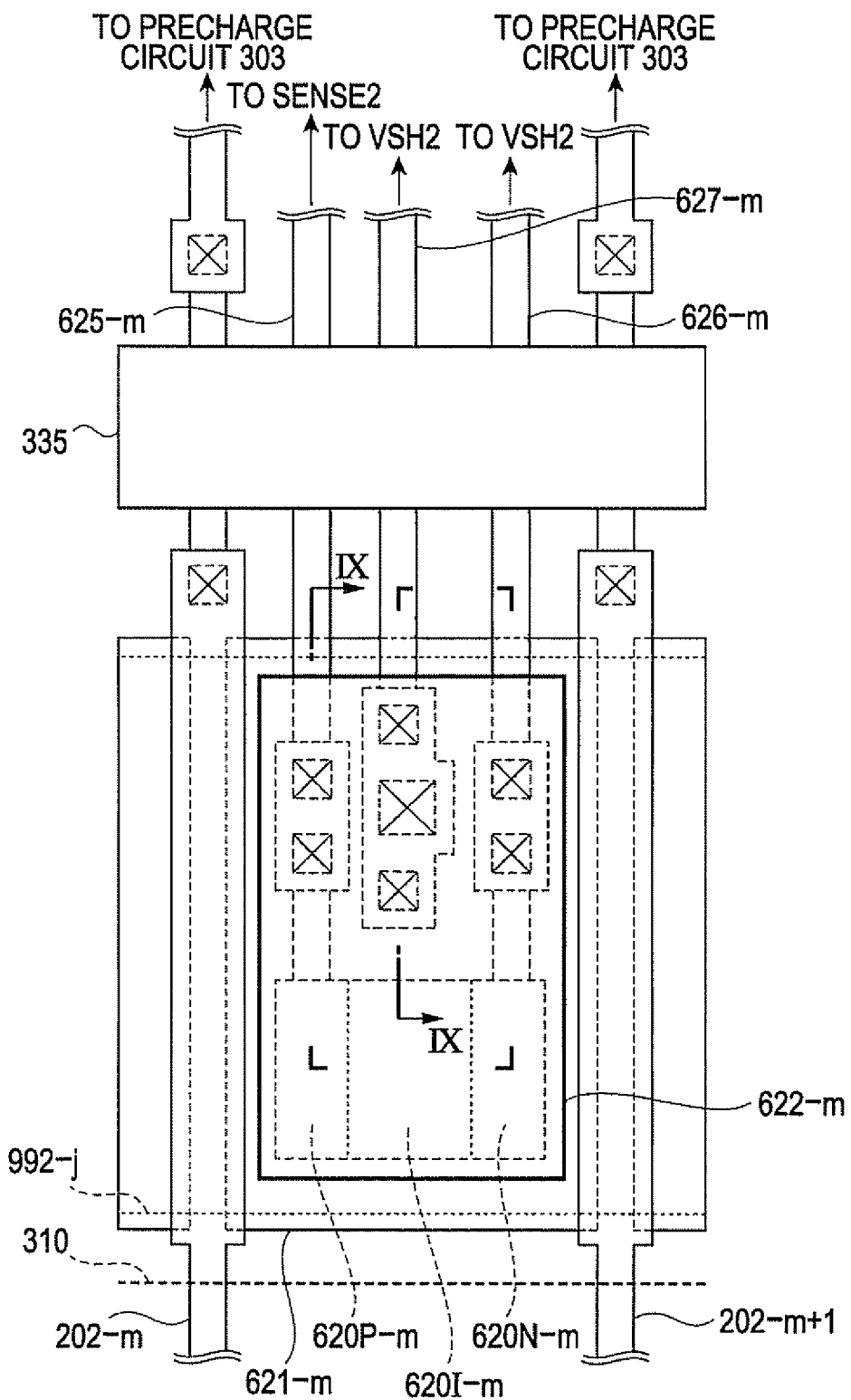
FIG. 10 is an enlarged plan view illustrating an m-th second-side optical sensor included in a second-side light-receiving sensor group according to the first embodiment of the invention.

FIG. 10 is an enlarged plan view illustrating an m-th second-side optical sensor 352-*m* included in the second-side light-receiving sensor group. The explanatory note shown in FIG. 5 is also employed in FIG. 10. The m-th second-side optical sensor 352-*m* includes an anode region 620P (620P-m), an intrinsic region 620I (620I-m), and a cathode region 620N (620N-m). The m-th second-side optical sensor 352-m is arranged between a data line 202-m and a data line 202-m+1 so as to be overlapped with a j-th second-side light-receiving opening 992-j. Here, "j" is a number corresponding to "m", that is, "j=1" corresponds to "m=1 to 240", "j=2" corresponds to "m=481 to 720", "j=3" corresponds to "m=961 to 1200", and "j=4" corresponds to "m=1441 to 1680".

Configurations of the anode region 620P-m, the intrinsic region 620I-m, and the cathode region 620N-m are the same as those of the anode region 610P-n, the intrinsic region 610I-n, and the cathode region 610N-n, respectively, except that each of the anode region 620P-m, the intrinsic region 620I-m, and the cathode region 620N-m has a length of 25 μm in a direction parallel to a junction surface, and therefore, descriptions of the configurations thereof are omitted. Furthermore, the m-th second-side optical sensor 352-m is entirely overlapped with a light-shielding electrode 621-m included in light-shielding electrodes 621 and a transparent shielding electrode 622-m included in transparent shielding electrodes 622. This configurations of the light shielding electrode 621-m and the transparent shielding electrode 622-m are the same as the configurations of the light-shielding electrode 611-n and the transparent shielding electrode 612-n shown in FIG. 8, respectively, and therefore, descriptions thereof are omitted. Moreover, the anode region 620P-m is connected to an anode electrode 625 (625-m) through a contact hole. The cathode region 620N-m is connected to a cathode electrode 626-m included in cathode electrodes 626 through a contact hole. The light-shielding electrode 621-m and the transparent shielding electrode 622-m are connected to a BT electrode 627-m included in BT electrodes 627 through a contact hole. These configurations are also the same as the configurations of the anode electrode 615-n, the cathode electrode 616-n, and the BT electrode 617-n, and therefore, descriptions thereof are omitted. In addition, FIG. 9 is also a sectional view taken along line IX-IX shown in FIG. 10, but reference numerals shown in FIG. 9 should be appropriately replaced by reference numerals as shown in FIG. 10, and therefore, the description thereof is omitted.

Note that an m'-th second-side light sensor 352-m' included in the second-side light-shielding sensor group has a configuration similar to the m-th second-side optical sensor 352-m except that the m'-th second-side light sensor 352-m' is not overlapped with the j-th second-side light-receiving opening 992-j, an anode electrode 625-m' is connected to the line VSL2, a cathode electrode 626-m' is connected to the line SENSE2, and a BT electrode 627-m' is connected to the line VDBT2.

Arrangement of an n-th third-side optical sensor 353-n which is arranged between a capacitor line 203-n−1 and a capacitor line 203-n is 180 degrees different from the arrangement of the n-th first-side optical sensor 351-n shown in FIG. 8 and is different only in that the electrodes connected to the line SENSE1, the line VSH1, the line VSL1, the line VDBT1 in the arrangement of the n-th first-side optical sensor 351-n are connected to the line SENSE3, the line VSH3, the line VSL3, and the line VDBT3 in the arrangement of the n-th third-side optical sensor 353-n. Therefore, description of the arrangement of the n-th third-side optical sensor 353-n is omitted. Similarly, arrangement of an m-th fourth-side optical sensor 354-m is 180 degrees different from the arrangement of the m-th second-side optical sensor 352-m shown in FIG. 10 and is different only in that the electrodes connected to the line SENSE2, the line VSH2, the line VSL2, the line VDBT2 in the arrangement of the m-th second-side optical sensor 352-m are connected to the line SENSE4, the line VSH4, the line VSL4, and the line VDBT4 in the arrangement of the m-th fourth-side optical sensor 354-m. Therefore, description of the arrangement of the m-th fourth-side optical sensor 354-m is omitted.

Figure 11:
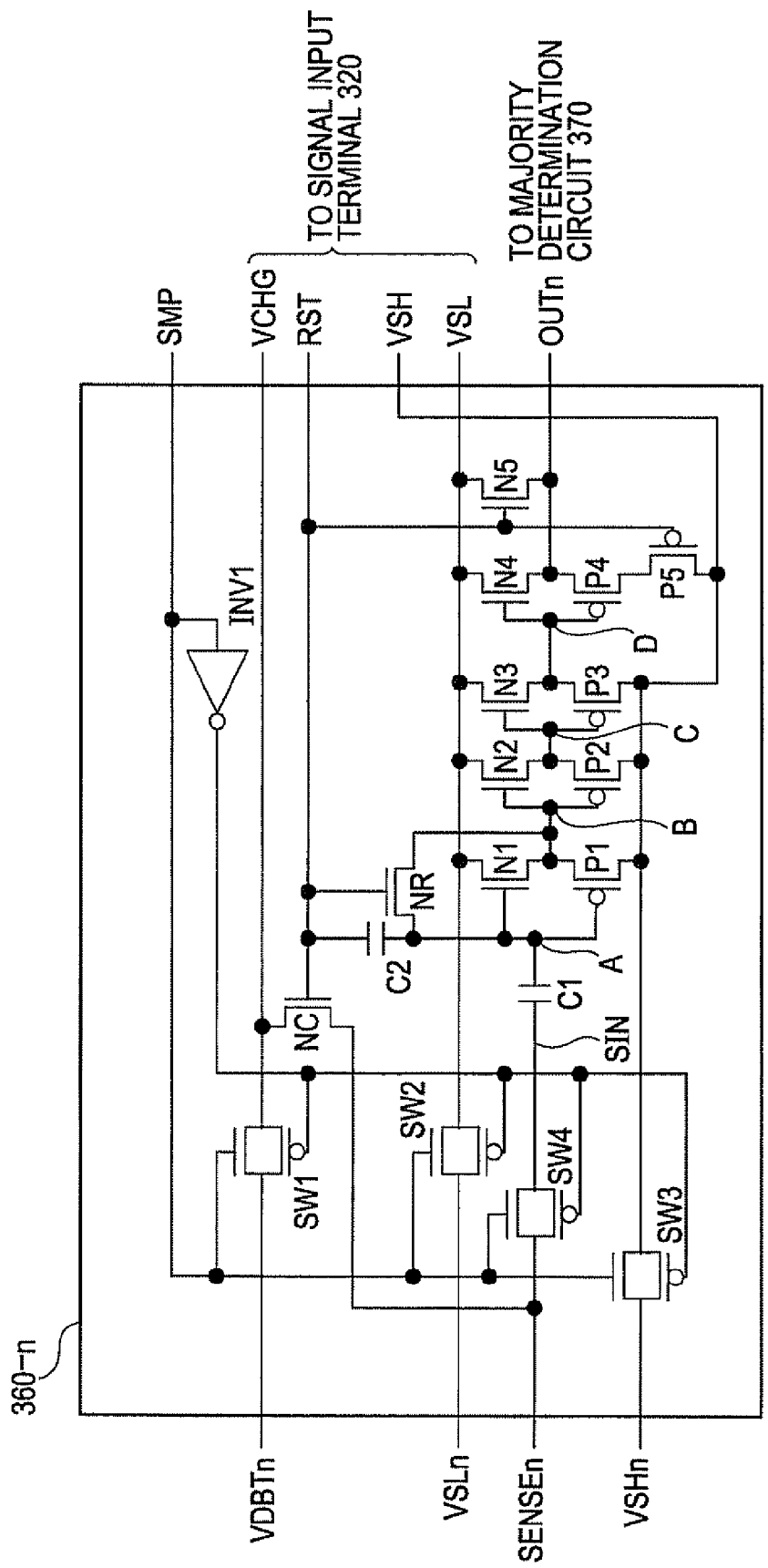
FIG. 11 is a circuit diagram illustrating an n-th detection circuit according to the first embodiment of the invention.

FIG. 11 is a circuit diagram illustrating an n-th detection circuit 360-n (n=1 to 4) among the detection circuits 360. A line SMP, a line VCHG, a line RST, a line VSL, and a line VSH are connected to the signal input terminals 320 so as to receive potentials and signals as needed from the external power supply circuit 784. Here, the line VCHG has a potential VVCHG of 2.0V supplied thereto, the line VSL has a potential VVSL of 0.0V supplied thereto, and the line VSH has a potential VVSH of 5.0V supplied thereto. Note that the potential VVSL supplied to the line VSL corresponds to a ground potential GND of the liquid crystal display device 910. An output line OUTn is connected to the majority determination circuit 370.

A line VDBT (VDBTn) is connected to one end of a first switch SW1, the line VSL (VSLn) is connected to one end of a second switch SW2, the line VSH (VSHn) is connected to one end of a third switch SW3, and a line SENSE (SENSEn) is connected to one end of the fourth switch SW4. Each of the first switch SW1 to the fourth switch SW4 is constituted by a CMOS transmission gate. The other end of the first switch SW1 is connected to the line VCHG, the other end of the second switch SW2 is connected to the line VSL, the other end of the third switch SW3 is connected to the line VSH, and the other end of the fourth switch SW4 is connected to a node SIN. Among all gate electrodes of the first switch SW1 to the fourth switch SW4, gate electrodes of n-channel transistors are connected to the line SMP, and gate electrodes of p-channel transistors are connected to an output terminal of an inverter circuit INV1. An input terminal of the inverter circuit INV1 is connected to the line SMP.

One end of a first capacitor C1 is connected to the node SIN, and the other end of the first capacitor C1 is connected to a node A. A source electrode of an initialization transistor NC is connected to the line VCHG so as to receive the potential VVCHG of 2.0V. A gate electrode of the initialization transistor NC is connected to the line RST, and a drain electrode of the initialization transistor NC is connected to the line SENSEn. The node A is also connected to a gate electrode of a first N-type transistor N1, a gate electrode of a first P-type transistor P1, a drain electrode of a resetting transistor NR, and one end of a second capacitor C2. The other end of the second capacitor C2 is connected to the line RST. A drain electrode of the first N-type transistor N1, a drain electrode of the first P-type transistor P1, and a source electrode of the resetting transistor NR are connected to a node B. The node B is also connected to a gate electrode of a second N-type transistor N2 and a gate electrode of a second P-type transistor P2. A drain electrode of the second N-type transistor N2 and a drain electrode of the second P-type transistor P2 are connected to a node C. The node C is also connected to a gate electrode of a third N-type transistor N3 and a gate electrode of a third P-type transistor P3. A drain electrode of the third N-type transistor N3 and a drain electrode of the third P-type transistor P3 are connected to a node D. The node D is also connected to a gate electrode of a fourth N-type transistor N4 and a gate electrode of a fourth P-type transistor P4. A drain electrode of the fourth N-type transistor N4 and a drain electrode of the fourth P-type transistor P4 are connected to the output line OUTn. The output line OUTn is also connected to a drain electrode of a fifth N-type transistor N5. A gate electrode of the fifth N-type transistor N5 and a gate electrode of a fifth P-type transistor P5 are connected to the line RST. A drain electrode of the fifth P-type transistor P5 is connected to a source electrode of the fourth P-type transistor P4. Source electrodes of the first N-type transistor N1 to the fifth N-type transistor N5 are connected to the line VSL so as to receive the potential VVSL of 0V supplied thereto. Source electrodes of the first P-type transistor P1 to the third P-type transistor P3 and the fifth P-type transistor P5 are connected to the line VSH so as to receive the potential VVSH of +5V supplied thereto. In addition, electric power having a voltage of +9V and electric power having a voltage of −4V are supplied to the inverter circuit INV1.

Here, in this embodiment, the first N-type transistor N1 has a channel width of 10 μm, the second N-type transistor N2 has a channel width of 35 μm, the third N-type transistor N3 has a channel width of 100 μm, the fourth N-type transistor N4 has a channel width of 150 μm, the fifth N-type transistor N5 has a channel width of 150 μm, a sixth N-type transistor N11 has a channel width of 4 μm, and a seventh N-type transistor N21 has a channel width of 200 μm. The first P-type transistor P1 has a channel width of 10 μm, the second P-type transistor P2 has a channel width of 35 μm, the third P-type transistor P3 has a channel width of 100 μm, the fourth P-type transistor P4 has a channel width of 300 μm, the fifth P-type transistor P5 has a channel width of 300 μm, a sixth P-type transistor P11 has a channel width of 200 μm, and a seventh P-type transistor P21 has a channel width of 4 μm. The resetting transistor NR has a channel width of 2 μm, and the initialization transistor NC has a channel width of 50 μm. The N-type transistors and the P-type transistors of the first switch SW1 to the fourth switch SW4 each have channel widths of 100 μm, and the N-type transistors and the P-type transistors of the inverter circuit INV1 and an inverter circuit INV2 each have channel widths of 50 μm. All these N-type transistors each have channel lengths of 8 μm, and all these P-type transistors each have channel lengths of 6 μm. All these N-type transistors each have mobility of 80 cm$^2$/Vsec, and all these P-type transistors each have mobility of 60 cm$^2$/Vsec. All these N-type transistors each have threshold voltages (Vth) of +1.0V, and all these P-type transistors each have threshold voltages (Vth) of −1.0V. The first capacitor C1 has a capacitance of 1 pF, and the second capacitor C2 has a capacitance of 38 fF.

Figure 12:
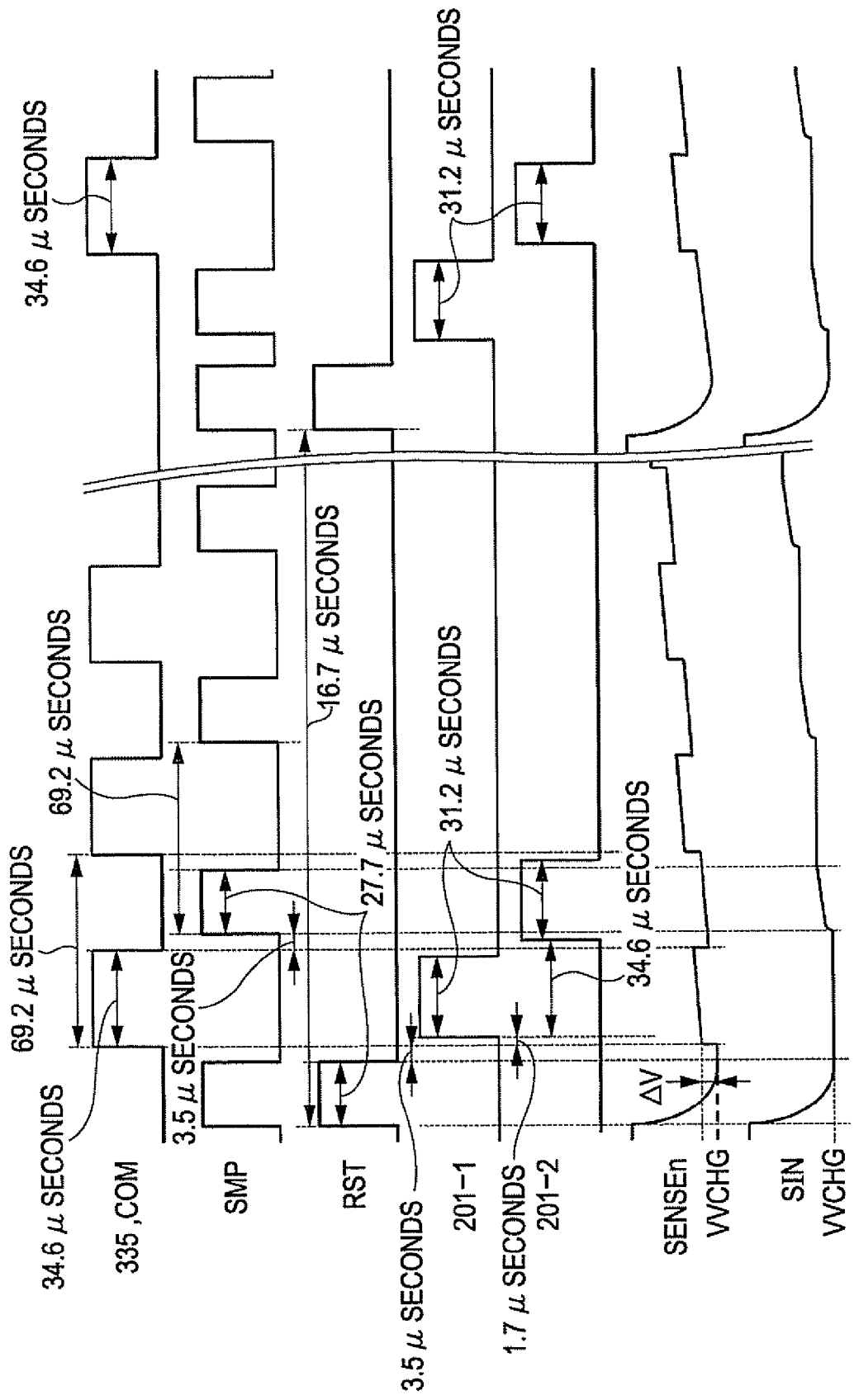
FIG. 12 is a timing chart according to the first embodiment of the invention.

FIG. 12 is a timing chart illustrating signals to be supplied to the line RST, the line SMP, the common potential line 335, the scanning line 201-1, and the scanning line 201-2. Note that the axis of ordinate and the axis of abscissa are not precisely shown in scale for convenience of explanation. The scanning line 201-1 and the scanning line 201-2 are driven using the scanning line driving circuit 301 so as to be selected for 31.2 μsec every 16.7 msec. The scanning line 201-2 is selected 34.6 μsec after the scanning line 201-1 is selected. Similarly, the remaining scanning lines from the scanning line 201-3 and onwards are successively selected with time intervals of 34.6 μsec. A potential of the common potential line 335 is switched between a high potential of 5V and a low potential of 0V every 34.6 μsec, and a phase of the potential is shifted by a half cycle every 16.7 msec. Accordingly, every time the scanning line 201-n is selected, a polarity applied to the common potential line 335 is inverted. That is, an 1H common inversion driving is performed. An RST signal is selected for 27.7 μsec, 32.9 μsec before the scanning line 201-1 is selected. At this time, the common potential line 335 has the low potential of 0V and none of the scanning lines 201-1 to 201-480 are selected. An SMP signal is selected for 27.7 μsec, 3.5 μsec after the potential of the common potential line 335 is inverted, while the common potential line 335 has the low potential. While the RST signal is in an on-state, the SMP signal is also in an on-state. Each of the RST signal, the SMP signal, and the scanning line 201-n has a high potential of +9V when selected whereas each of the RST signal, the SMP signal, and the scanning line 201-n has a low potential of −4V when not selected.

With this configuration, when the line RST has a high potential of +9V, each of the line SENSEn and the node SIN has the potential VVCHG of 2.0V applied thereto. The line VDBTn has the potential VVCHG applied thereto, the line VSLn has the potential VVSL applied thereto, and the line VSHn has the potential VVSH applied thereto. Furthermore, since the resetting transistor NR is turned on, the node A and the node B are short-circuited to each other, and each of the node A and the node B has a potential of 2.5V applied thereto in this embodiment. Note that while the line RST has the high potential of 9V, the fifth N-type transistor N5 is in an on-state and the fifth P-type transistor P5 is in an off-state, and accordingly, the output line OUTn has a potential of 0V.

When the potential of the line RST becomes a low potential of −4V after 27.7 μsec elapsed, the resetting transistor NR is turned off, the node A and the node B are electrically disconnected from each other, and the potential of the node A is reduced by 0.5V simultaneously with the reduction of the potential of the line RST since the second capacitor C2 is connected to the node A, and accordingly, the node A has a potential of 2.0V. At a time point when the potential of the line RST becomes the low potential of −4V after 27.7 μsec elapsed, the line SENSEn has the potential VVCHG of 2.0V, the line VSLn has the potential VVSL of 0.0V, and the line VSHn has the potential VVSH of 5.0V. Accordingly, a reverse bias of 3.0V is applied from the first-side light-receiving sensor group to the fourth-side light-receiving sensor group, and a reverse bias of 2.0 V is applied from the first-side light-shielding sensor group to the fourth-side light-shielding sensor group. Furthermore, the potential VVSL is output from the output line OUTn. At this time point, a thermoelectric current supplied from the first-side light-receiving sensor group to the fourth-side light-receiving sensor group is substantially equal to a thermoelectric current supplied from the first-side light-shielding sensor group to the fourth-side light-shielding sensor group. In addition, a photoelectric current Iphoto which is proportional to an intensity of external light emitted from the first-side light-receiving sensor group to the fourth-side light-receiving sensor group is supplied to the line SENSEn, and the potential of the line SENSEn increases at a speed in proportion to an amount of the photoelectric current Iphoto. The line VSHn and the line VSLn also receive current supplied thereto, and the potentials of the line VSHn and the line VSLn are brought to potentials close to the potential of the line SENSEn. However, since the potential of the line SMP is brought into the high level (9V) every 69.2 μsec, and simultaneously, the second switch SW2 and the third switch SW3 are turned on, the potentials of the line VSHn and the line VSLn return to original potentials. Accordingly, the potentials of the line VSHn and the line VSLn are barely changed.

Note that the relationship between the speed of the potential change of the line SENSEn and an amount of light emitted to an n-th side light-receiving sensor group is represented by a linear equation, and a coefficient representing inclination is determined using the line SENSEn and a sum of load capacities of anode electrodes of the n-th side light-receiving sensor group and load capacities of cathode electrodes of an n-th side light-shielding sensor group which are connected to the line SENSEn. However, in this embodiment, coefficients representing inclinations of the first-side light-receiving sensor group to the fourth-side light-receiving sensor group (n=1 to 4) are identical. That is, capacities obtained from a calculation "(photoelectric current Iphoto)/(line SENSEn)" under a fixed amount of light for the first-side light-receiving sensor group to the fourth-side light-receiving sensor group are controlled to be identical.

As described above, while the potential of the line RST is low (=−4V), the node A is in a floating state. Therefore, the potential of the node A and a potential of the node SIN simultaneously increase due to capacitance coupling between the node A and the node SIN with the first capacitor C1 interposed therebetween. When the potential of the node A and the potential of the node SIN become 2.5V, a potential of the output line OUTn is brought to a high level (=5V).

In this embodiment, the first-side light-receiving sensor group to the fourth-side light-receiving sensor group are arranged near the display region 310, and the anode electrode 615-n, the cathode electrode 616-n, and the BT electrode 617-n intersect the common potential line 335. Furthermore, presence of the capacitors connected through the light-shielding electrodes to the scanning line 201-n, the data line 202-m, and the capacitor line 203-n through the light-shielding electrodes invites electromagnetic noise. In particular, the common potential line 335 and the line SENSEn are coupled with each other by nonnegligible capacitance, and therefore, the potential of the line SENSEn is varied in accordance with a polarity of the common potential line 335. Referring to FIG. 12 including a timing chart of the line SENSEn, when the potential of the common potential line 335 is changed from a low level (0V) to a high level (5V), a potential of the line SENSEn increases by ΔV due to capacitance coupling whereas when the potential of the common potential line 335 is changed from a high level (5V) to a low level (0V), the potential of the line SENSEn decreases by ΔV. However, in this embodiment, since the node SIN and the line SENSEn are brought to conductive states only when the SMP signal is supplied, the potential of the node SIN is not changed at a time of the polarity inversion of the common potential line 335 as shown in FIG. 12. Accordingly, malfunction caused by the change of the potential of the common potential line 335 can be avoided.

Similarly, in this embodiment, the line VDBTn, the line VSLn, and the line VSHn (n=1 to 4) are electrically connected to the line VCHG, the line VSL, and the line VSH, respectively, only when the SMP signal is in an on-state, and otherwise these lines are brought to floating states. With this configuration, the potential of the line VDBTn, the potential of the line VSLn, the potential of the line VSHn (n=1 to 4) are changed by approximately ΔV due to capacitance coupling when the polarity of the common potential line 335 is inverted. Accordingly, even when the polarity of the common potential line 335 is inverted, the bias applied from the first-side light-receiving sensor group to the fourth-side light-receiving sensor group and the bias applied from the first-side light-shielding sensor group to the fourth-side light-shielding sensor group are not changed. Accordingly, the photoelectric current Iphoto and the thermoelectric current supplied from the first-side light-receiving sensor group to the fourth-side light-receiving sensor group and the thermoelectric current supplied from the first-side light-shielding sensor group to the fourth-side light-shielding sensor group are stable irrespective of the polarity of the common potential line 335.

Figure 13:
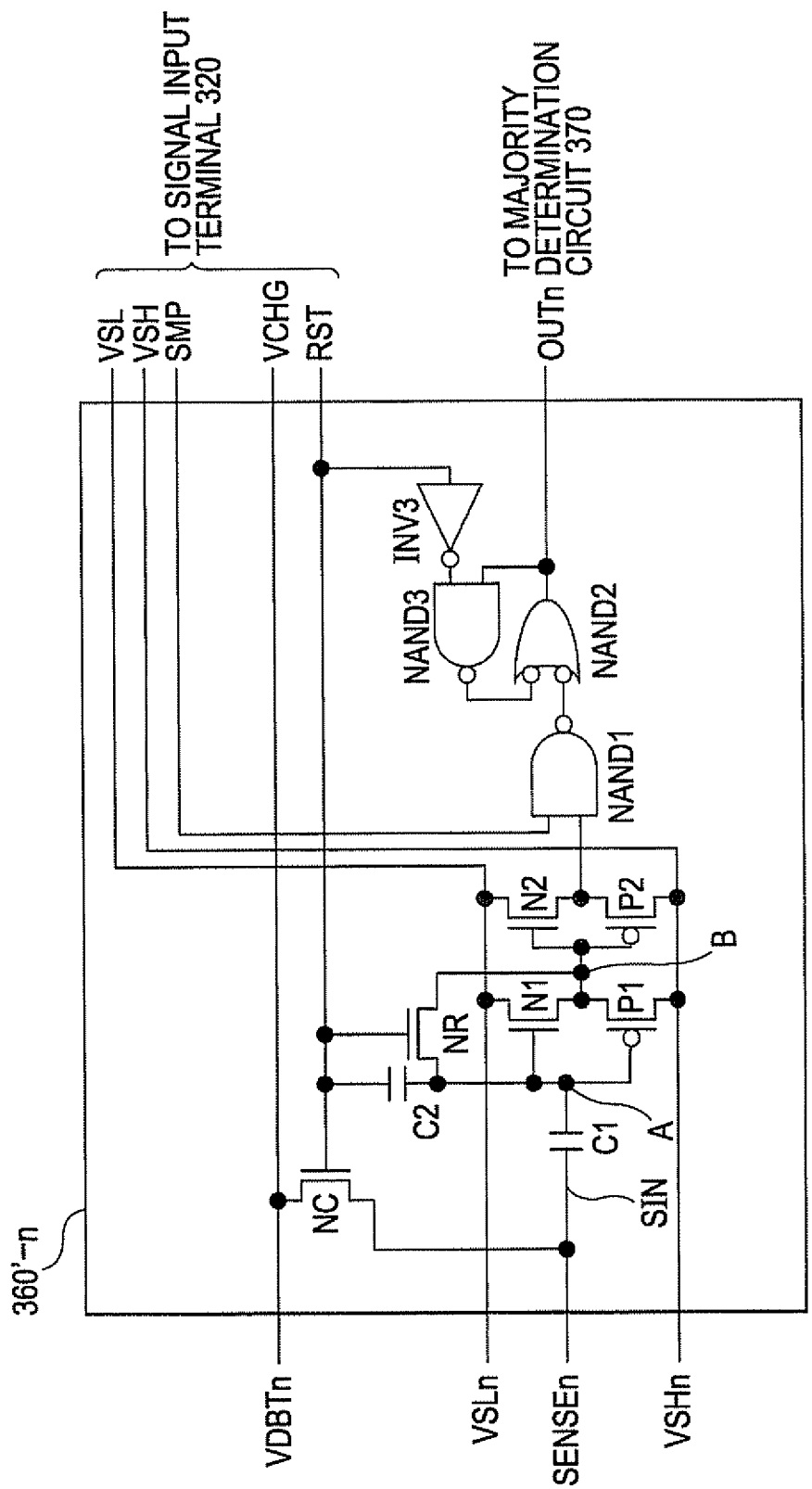
FIG. 13 is a circuit diagram illustrating an n-th detection circuit according to a modification of the first embodiment of the invention.

The configuration described above is employed in this embodiment since the value ΔV is comparatively large. However, in a case where the value ΔV is comparatively small, that is, the value ΔV is smaller than 1V, the first switch SW1, the second switch SW2, and the fourth switch SW4 may be eliminated. To describe such a case, another configuration example of each of the detection circuits will be described with reference to FIG. 13. FIG. 13 shows an n-th detection circuit 360'-n included in detection circuits 360'. In this example, when compared with the n-th detection circuit 360-n shown in FIG. 11, the first switch SW1 to the fourth switch SW4 are eliminated, and accordingly, the line VDBTn is short-circuited to the line VCHG, the line VSLn is short-circuited to the line VSL, the line VSHn is short-circuited to the line VSH, and the line SENSEn is short-circuited to the node SIN. With this configuration, the node SIN has amplitude corresponding to the polarity of the common potential line 335 (similarly to the timing chart of the line SENSEn of FIG. 12). Therefore, when a detection operation is performed all over the periods, malfunction may occur when the potential of the common potential line 335 is changed to a high level (5V). To address this problem, the third N-type transistor N3 to the fifth N-type transistor N5 and the third P-type transistor P3 to the fifth P-type transistor P5 are eliminated, the drain electrode of the second N-type transistor N2 and the drain electrode of the second P-type transistor P2 are connected to one of input terminals of a first NAND circuit NAND1, the other of the input terminals of the first NAND circuit NAND1 is connected to the SMP line, an output terminal of the first NAND circuit NAND1 is connected to one of input terminals of a second NAND circuit NAND2, the other of the input terminals of the second NAND circuit NAND2 is connected to an output terminal of a third NAND circuit NAND3, one of input terminals of the third NAND circuit NAND3 is connected to an output terminal of the second NAND circuit NAND2, the other of the input terminals of the third NAND circuit NAND3 is connected to an output terminal of an inverter circuit INV3, and an input terminal of the inverter circuit INV3 is connected to the line RST. Electric power is supplied to the first NAND circuit NAND1 to the third NAND circuit NAND3 and the inverter circuit INV3 from the line VSH and the line VSL. Other configurations and operations of the n-th detection circuit 360'-n are the same as those of the n-th detection circuit 360-n shown in FIG. 11, and therefore, components similar to those shown in FIG. 11 are denoted by the reference numerals used in FIG. 11 and descriptions thereof are omitted. With this configuration, only when the potential of the node SIN is equal to or larger than 2.5V and the potential of the line SMP is high, a signal output from the first NAND circuit NAND1 is in a low level. The second NAND circuit NAND2 and the third NAND circuit NAND3 are configured as RS flip flop circuits. A signal output from the first NAND circuit NAND1 functions as a setting signal having a negative polarity and a signal output from the inverter circuit INV3 functions as a resetting signal having a negative-polarity. Specifically, when a RESET signal is brought to a high level (9V), a signal supplied to the output line OUTn is latched to low, whereas when the potential of the node SIN is equal to or larger than 2.5V and the SMP signal is first brought to a high level, the signal supplied to the output line OUTn is latched to high. Accordingly, since a result of the detection operation performed while the potential of the common potential line 335 is high (5V) is invalid, malfunction is avoided.

Figure 14:
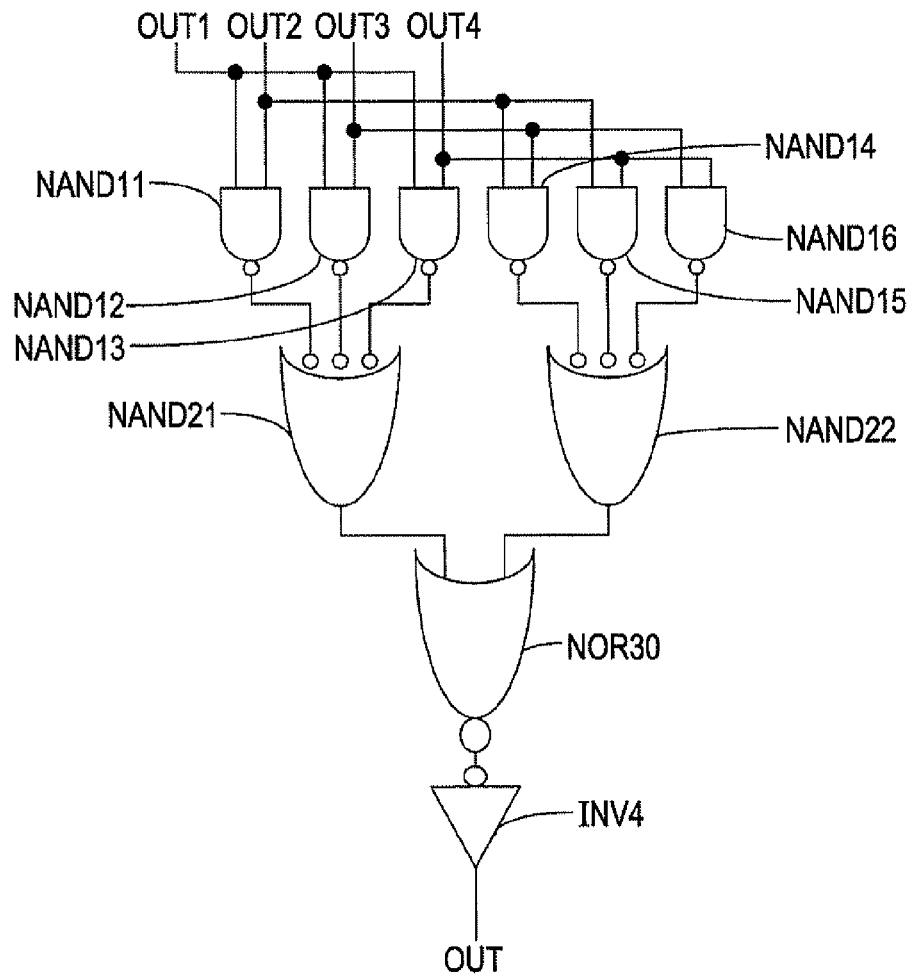
FIG. 14 is a circuit diagram illustrating a majority determination circuit according to the first embodiment of the invention.

FIG. 14 is a diagram illustrating the majority determination circuit 370. Among the output lines OUT1 to OUT4, two of the output lines OUT1 to OUT4 are connected to a pair of input terminals of a fourth NAND circuit NAND11, a pair of input terminals of a fifth NAND circuit NAND12, a pair of input terminals of a sixth NAND circuit NAND13, a pair of input terminals of a seventh NAND circuit NAND14, a pair of input terminals of a eighth NAND circuit NAND15, or a pair of input terminals of a ninth NAND circuit NAND16 by permutation and combination. An output terminal of the fourth NAND circuit NAND11, an output terminal of the fifth NAND circuit NAND12, and an output terminal of the sixth NAND circuit NAND13 are connected to input terminals of a tenth NAND circuit NAND21. An output terminal of the seventh NAND circuit NAND14, an output terminal of the eighth NAND circuit NAND15, and an output terminal of the ninth NAND circuit NAND16 are connected to input terminals of an eleventh NAND circuit NAND22. An output terminal of the tenth NAND circuit NAND21 and an output terminal of the eleventh NAND circuit NAND22 are connected to input terminals of a first NOR circuit NOR30. An output terminal of the first NOR circuit NOR30 is connected to an input terminal of an inverter circuit INV4. An output terminal of the inverter circuit INV4 is connected to the output line OUT. Electric power is supplied from the line VSH and the line VSL to the fourth NAND circuit NAND11, the fifth NAND circuit NAND12, the sixth NAND circuit NAND13, the seventh NAND circuit NAND14, the eighth NAND circuit NAND15, the ninth NAND circuit NAND16, the tenth NAND circuit NAND21, the eleventh NAND circuit NAND22, and the first NOR circuit NOR30. In the majority determination circuit 370, when potentials of any two of the output lines OUT1 to OUT4 are brought to high levels (5V), a high potential of 5V is output from the output line OUT. On the other hand, in the majority determination circuit 370, when all the output lines OUT1 to OUT4 have low potentials of 0V or only one of the output lines OUT1 to OUT4 has a high potential of 5V, a low potential of 0V is output from the output line OUT. With this configuration, a period of time from when the potential of the line RST is brought to a low level (−4V) to when the potential of the output line OUT is inverted to a high potential of 5V is inversely proportional to an amount of light emission detected using one of the first-side light-receiving sensor group to the fourth-side light-receiving sensor group which has a second largest amount of light emission. In this embodiment, the majority determination circuit 370 described above is used to eliminate, among results of detections of light intensities for the four sides, a result representing the highest light intensity for one of the four sides so as to prevent malfunction when a spotlight having light intensity higher than external light encounters the one of the four sides. Furthermore, since a result representing the lowest light intensity and a result representing the second lowest light intensity are also eliminated, even when shadow of a finger, for example, covers two of the four sides, a sufficient result can be obtained.

Figure 15:
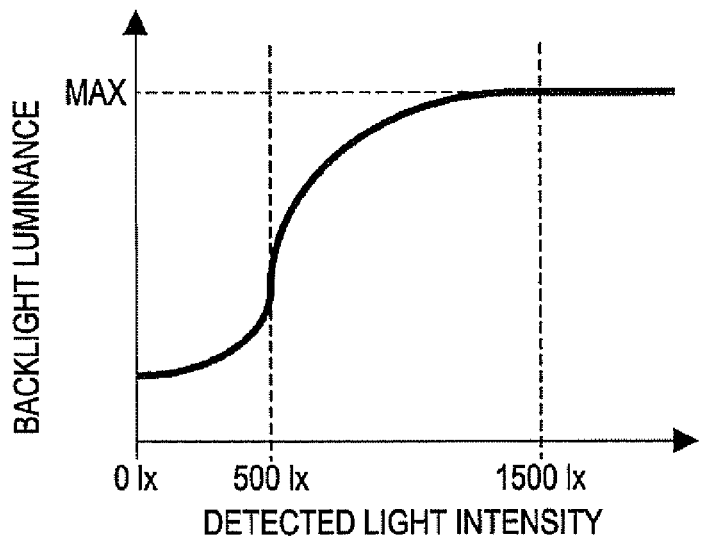
FIG. 15 is a graph illustrating the relationship between detected an intensity of external light and backlight luminance.

FIG. 15 is a graph illustrating the relationship between a detected intensity of external light and backlight luminance obtained on the basis of the signal output from the output line OUT. When the intensity of the external light is low, the luminance of the backlight is gradually changed. A degree of the change is then gradually increased so that the maximum luminance change is obtained when the intensity of the external light is 500 lux, and thereafter, the light intensity is gradually changed so that an S-shaped curve is shown in the graph, and the maximum luminance is obtained under the intensity of the external light of 1500 lux or more. A curve having an arbitrary shape may be set in accordance with characteristics of the electronic apparatus, and the light intensity may be gradually changed using an average value obtained in a predetermined period so that blinking of luminance is suppressed. Alternatively, hysteresis may be given to the relationship between the luminance and the light intensity. Furthermore, the curve may be changed in accordance with an operation state of the electronic apparatus such as a stand-by state and an operation state.

In this embodiment, although the light-receiving openings are arranged considerably close to the display region, malfunction can be avoided even when a common inversion driving method is employed, the display device is controlled to have an optimum luminance since the detection of light is accurately performed. In addition, a high level of visibility is attained, and power consumption is suppressed. Furthermore, even when one or two of the four sides are covered with a finger, for example, or even when a spotlight is incident on a specific portion, external light can be accurately measured, and accordingly, optimum luminance of the backlight is maintained.

Second Embodiment

Figure 16:
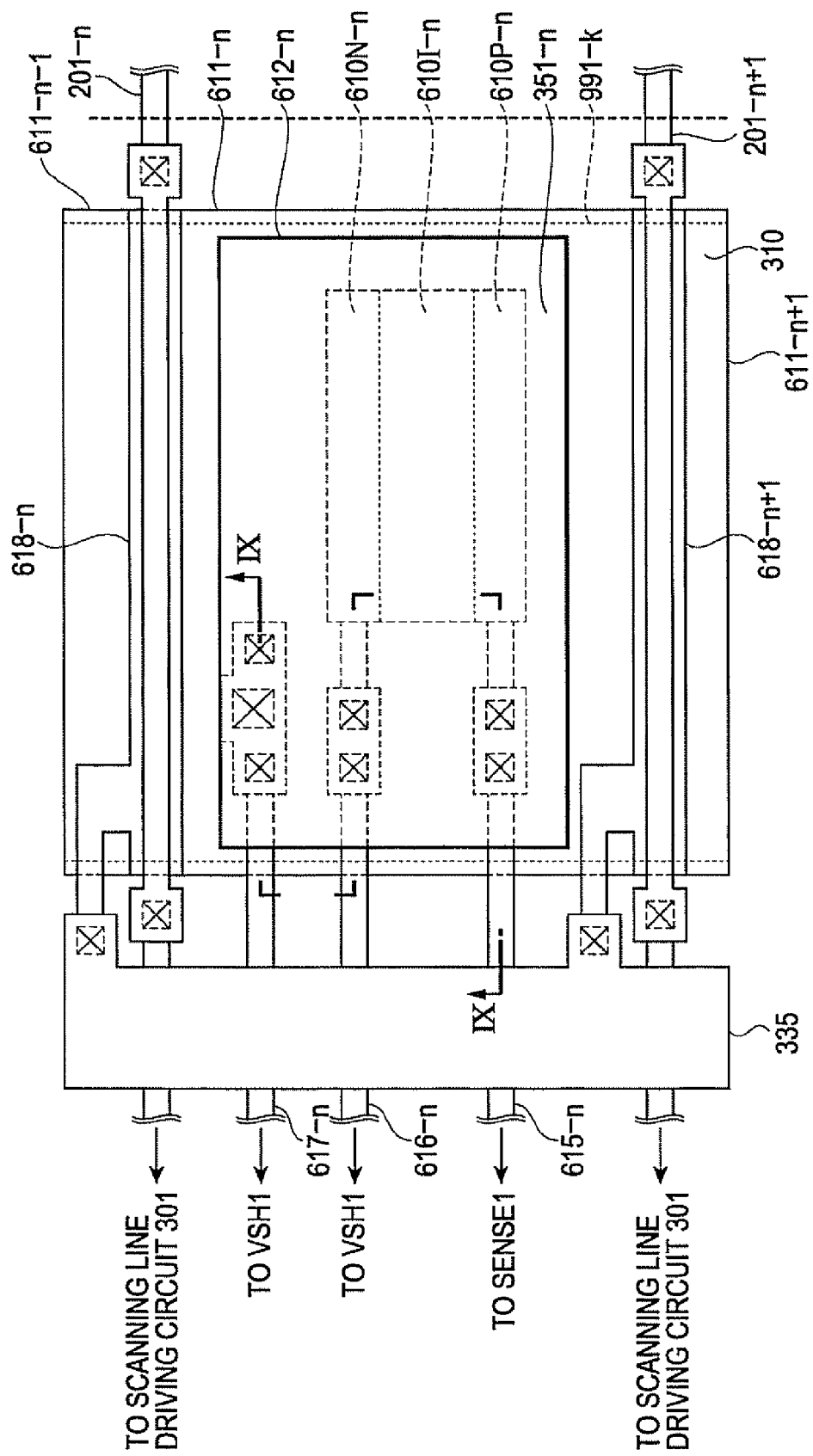
FIG. 16 is an enlarged plan view illustrating an n-th first-side optical sensor included in a first-side light-receiving sensor group according to a second embodiment of the invention.

FIG. 16 is an enlarged plan view illustrating an n-th first-side optical sensor 351-$n$ included in a first-side light-receiving sensor group according to a second embodiment, and corresponds to the n-th first-side optical sensor 351-$n$ according to the first embodiment shown in FIG. 8. The explanatory note shown in FIG. 5 is also employed in FIG. 16. Different points between the n-th first-side optical sensor 351-$n$ shown in FIG. 16 and the n-th first-side optical sensor 351-$n$ shown in FIG. 8 are mainly described hereinafter.

Unlike the scanning line 201-$n$ shown in FIG. 8, a scanning line 201-$n$ shown in FIG. 16 is formed of a thin film of an alloy of aluminum and neodymium (AlNd) through a contact hole in a region overlapped with a light-shielding electrode 611-$n$ in a plan view. A common potential branch line 618-$n$ formed of a molybdenum (Mo) thin film is arranged between the scanning line 201-$n$ and the light-shielding electrode 611-$n$. The common potential branch line 618-$n$ is connected through a contact hole to a common potential line 335 so as to receive a common potential (COM). Other configurations in FIG. 16 are the same as those shown in FIG. 8, and therefore, components similar to those shown in FIG. 8 are denoted by the reference numerals used in FIG. 8 and descriptions thereof are omitted.

Figure 17:
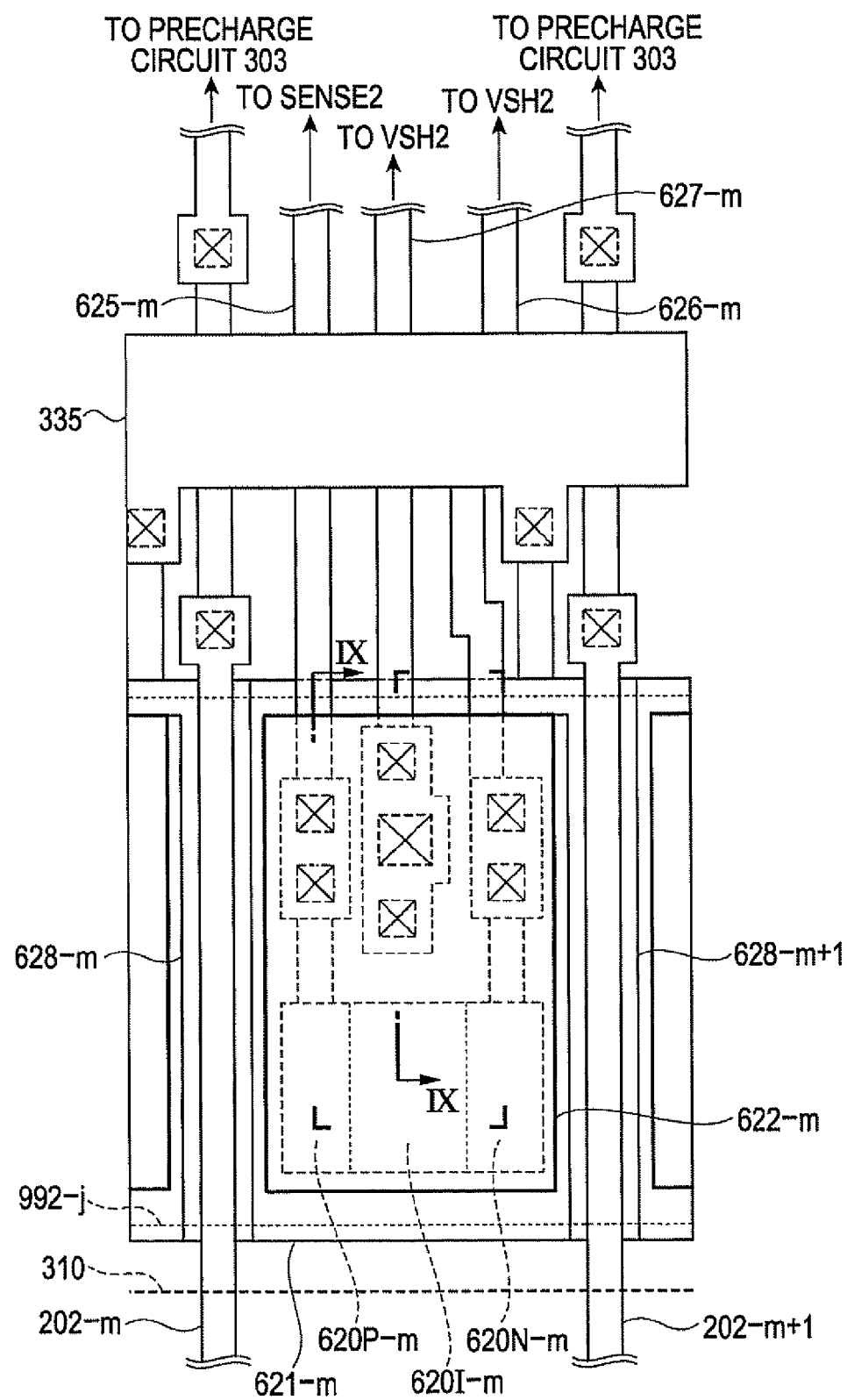
FIG. 17 is an enlarged plan view illustrating an n-th second-side optical sensor included in a second-side light-receiving sensor group according to the second embodiment of the invention.

FIG. 17 is an enlarged plan view illustrating an n-th second-side optical sensor 352-$n$ included in a second-side light-receiving sensor group according to the second embodiment, and corresponds to the n-th second-side optical sensor 352-$n$ according to the first embodiment shown in FIG. 10. The explanatory note shown in FIG. 5 is also employed in FIG. 17. Different points between the n-th second-side optical sensor 352-$n$ shown in FIG. 17 and the n-th second-side optical sensor 352-$n$ shown in FIG. 10 are mainly described hereinafter.

Unlike the data line 202-$m$ shown in FIG. 10, a common potential branch line 628-$m$ formed of a molybdenum (Mo) thin film is arranged between the data line 202-$m$ and the light-shielding electrode 621-$m$ included in the light-shielding electrodes 621 in a region in which the data line 202-$m$ and the light-shielding electrode 621-$m$ are overlapped with each other in a plan view. The common potential branch line 628-$m$ is connected through a contact hole to a common potential line 335 so as to receive a common potential (COM). Other configurations in FIG. 17 are the same as those shown in FIG. 10, and therefore, components similar to those shown in FIG. 10 are denoted by the reference numerals used in FIG. 10 and descriptions thereof are omitted.

Configurations of an active matrix substrate 101 and a liquid crystal display device 910 in this embodiment are the same as those of the first embodiment. Furthermore, a configuration of an electronic apparatus and a setting method of a light intensity and luminance of external light of this embodiment are the same as those of the first embodiment. Therefore, descriptions thereof are omitted.

When compared with the first embodiment, in the second embodiment, direct intersection capacitances are not generated in a region in which the scanning line 201-*n* and the light-shielding electrode 611-*n* are overlapped with each other and in a region in which the data line 202-*m* and the light-shielding electrode 621-*m* are overlapped with each other, since the common potential branch line 618-*n* and the common potential branch line 628-*m* are interposed therebetween, respectively. Therefore, even when potentials of the scanning line 201-*n* and the data line 202-*m* are changed, that is, even when the scanning line 201-*n* is selected using a scanning line driving circuit 301 and when different potentials (images) are written to the data line 202-*m* using a data line driving circuit 302 or a precharge circuit 303, potentials of the light-shielding electrode 611-*n* and the light-shielding electrode 621-*m* are barely changed. If the potentials of the light-shielding electrode 611-*n* and the light-shielding electrode 621-*m* are changed, potentials of a line SENSE1 and a line SENSE2 are also changed due to capacitance coupling. Accordingly, in this embodiment, measurement of a light intensity is performed with higher accuracy when compared with the first embodiment. In addition, since the shielding electrodes are connected to the common potential line 335 through the lines, power supply lines for the shielding electrodes are not necessary. The common potential line 335 is effectively used as a shield potential since the common potential line 335 normally has low impedance in order to maintain image quality. Although there arises a problem in that the common potential line 335 reversely driven generates noise disturbing the shield electrodes, since a driving method the same as that described in the first embodiment is employed in this embodiment, detection accuracy is not deteriorated due to potential changes which occur due to the capacitance coupling regarding the common potential line 335. However, since capacitance of the common potential line 335 increases in this embodiment, power consumption also increase. Accordingly, the configuration according to the first embodiment or the configuration according to the second embodiment may be appropriately selected in accordance with usage of the electronic apparatus taking advantages and disadvantages thereof described above into consideration.

Note that, in this embodiment, only the shield electrodes which overlap the n-th first-side optical sensor 351-*n* and the m-th second-side optical sensor 352-*m*, respectively, are modified. However, shield electrodes which overlap an n-th third-side optical sensor 353-*n* and an m-th fourth-side optical sensor 354-*m*, respectively, may be similarly modified as needed.

Third Embodiment

Figure 18:
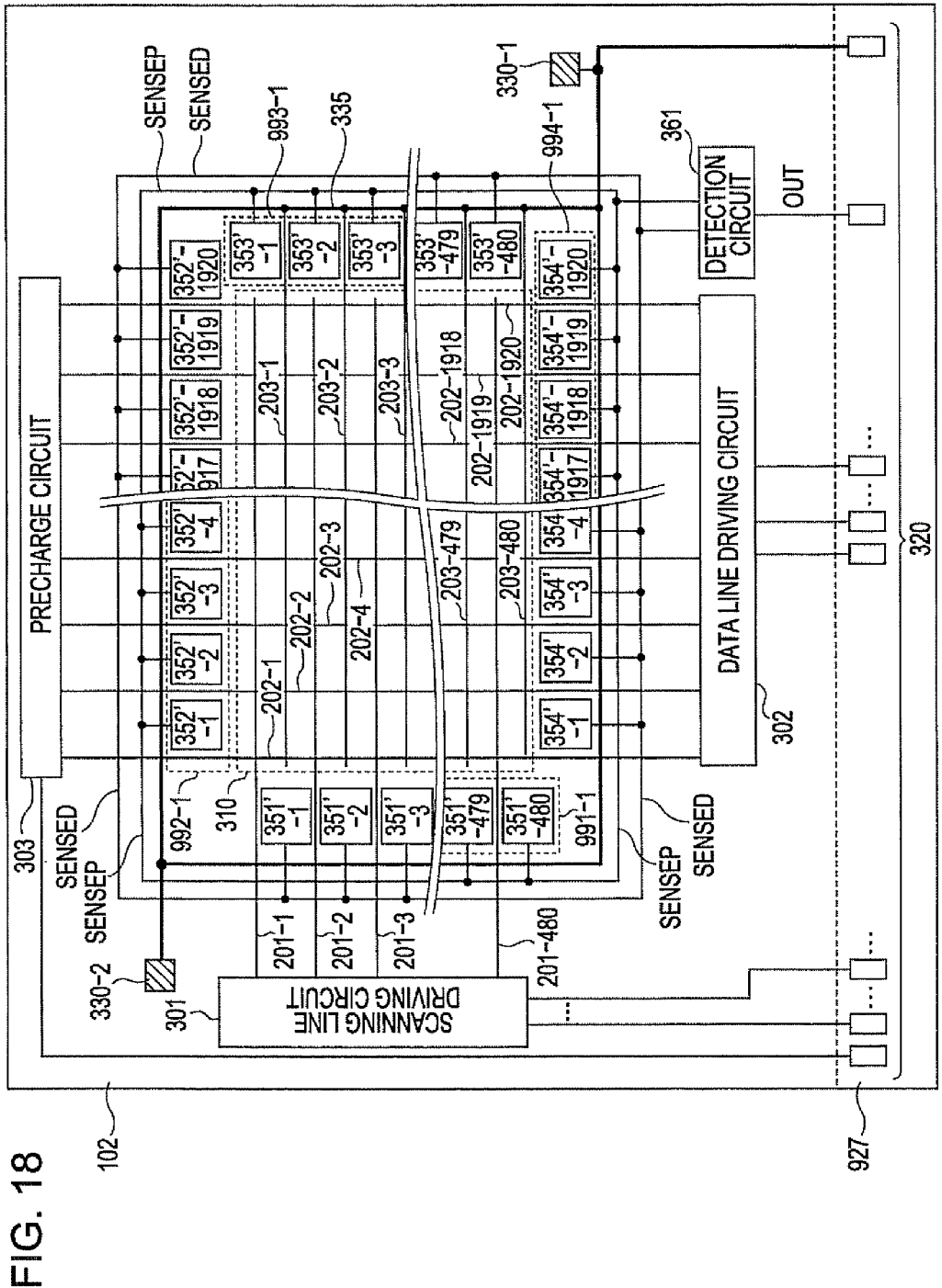
FIG. 18 is a diagram illustrating a configuration of an active matrix substrate according to a third embodiment of the invention.

FIG. 18 is a diagram illustrating a configuration of an active matrix substrate 102 according to a third embodiment. Different points between the active matrix substrate 102 and the active matrix substrate 101 according to the first embodiment shown in FIG. 2 are mainly described hereinafter. Components shown in FIG. 18 similar to those shown in FIG. 2 are denoted by the reference numerals used in FIG. 2 and descriptions thereof are omitted. In this embodiment, first-side optical sensors 351'-1 to 351'-480 are arranged as optical sensors 351' instead of the first-side optical sensors 351-1 to 351-480 of the first embodiment, second-side optical sensors 352'-1 to 352'-1920 are arranged as optical sensors 352' instead of the second-side optical sensors 352-1 to 352-1920, third-side optical sensors 353'-1 to 353'-480 are arranged as optical sensors 353' instead of the third-side optical sensors 353-1 to 353-480, and fourth-side optical sensors 354'-1 to 354'-1920 are arranged as optical sensors 354' instead of the fourth-side optical sensors 354-1 to 354-1920. Furthermore, a detection circuit 361 is arranged instead of the first detection circuit 360-1 to the fourth detection circuit 360-4.

Among the first-side optical sensors 351'-1 to 351'-480, optical sensors which are overlapped with one of a first first-side light-receiving opening 991-1 to a third first-side light-receiving opening 991-3 (a first-side light-receiving sensor group) are connected to a line SENSE (SENSEP), and the other remaining optical sensors (a first-side light-shielding sensor group) are connected to a line SENSE (SENSED). Similarly, among the second-side optical sensors 352'-1 to 352'-1920, optical sensors which are overlapped with one of a first second-side light-receiving opening 992-1 to a fourth second-side light-receiving opening 992-4 (a second-side light-receiving sensor group) are connected to the line SENSEP, and the other remaining optical sensors (a second-side light-shielding sensor group) are connected to the line SENSED. Similarly, among the third-side optical sensors 353'-1 to 353'-480, optical sensors which are overlapped with one of a first third-side light-receiving opening 993-1 to a third third-side light-receiving opening 993-3 (a third-side light-receiving sensor group) are connected to the line SENSEP, and the other remaining optical sensors (a third-side light-shielding sensor group) are connected to the line SENSED. Similarly, among the fourth-side optical sensors 354'-1 to 354'-1920, optical sensors which are overlapped with one of a first fourth-side light-receiving opening 994-1 to a fourth fourth-side light-receiving opening 994-4 (a fourth-side light-receiving sensor group) are connected to the line SENSEP, and the other remaining optical sensors (a second-side light-shielding sensor group) are connected to the line SENSED. The line SENSED and the line SENSEP are connected to the detection circuit 361. An output line OUT is connected to the detection circuit 361 at one end thereof and connected to an external device at the other end thereof through one of signal input terminals 320.

Figure 19:
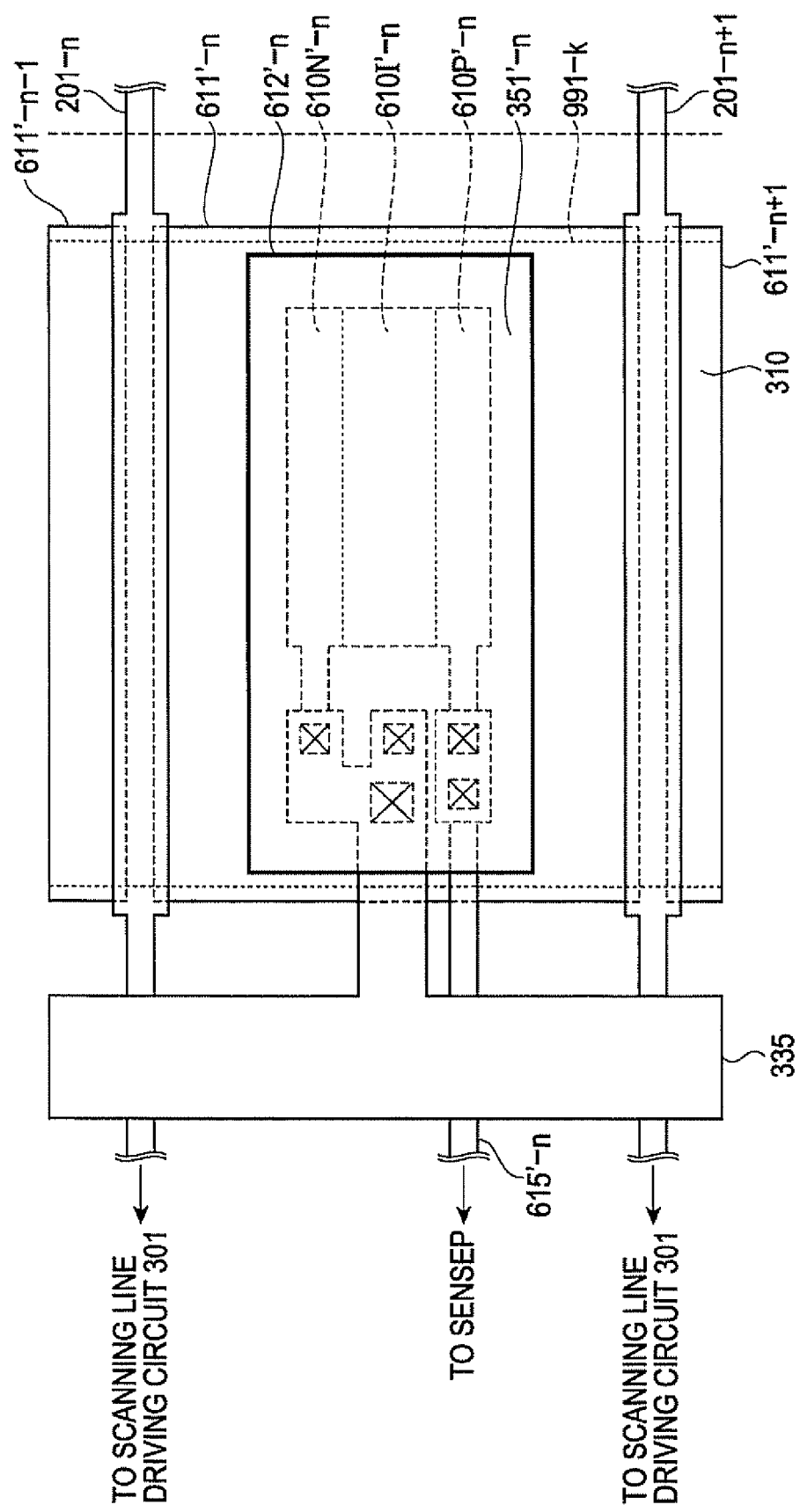
FIG. 19 is an enlarged plan view illustrating an n-th first-side optical sensor included in a first-side light-receiving sensor group according to a third embodiment of the invention.

FIG. 19 is an enlarged plan view illustrating an n-th first-side optical sensor 351'-*n* included in a first-side light-receiving sensor group according to the third embodiment and corresponds to the n-th first-side optical sensor 351-*n* according to the first embodiment shown in FIG. 8. The explanatory note shown in FIG. 5 is also employed in FIG. 19. Different points between the n-th first-side optical sensor 351'-*n* shown in FIG. 19 and the n-th first-side optical sensor 351-*n* shown in FIG. 8 are mainly described hereinafter.

In FIG. 19, the n-th first-side optical sensor 351'-*n* is a lateral PIN junction diode including an anode region 610P'-*n* included in anode regions 610P', an intrinsic region 610I'-*n* included in intrinsic regions 610I, and a cathode region 610N'-*n* included in cathode regions 610N'. Such a configuration of the n-th first-side optical sensor 351'-*n* is the same as that of the n-th first-side optical sensor 351-*n* including the anode region 610P-n, the intrinsic region 610I-n, and the cathode region 610N-n according to the first embodiment shown in FIG. 8, and therefore, description thereof is omitted. The anode region 610P'-n is connected to an anode electrode 615'-*n* included in anode electrodes 615' through a contact hole, and the anode electrode 615'-*n* is connected to the line SENSEP. The cathode region 610N'-n, the light-shielding electrode 611'-*n*, and a transparent shielding electrode 612'-*n* included in transparent shielding electrodes 612' are connected to the common potential line 335 through corresponding contact holes so as to receive common potentials (COM) supplied thereto. Other configurations in FIG. 19 are the same as those shown in FIG. 8, and therefore, components shown in FIG. 19 which are similar to those shown in FIG. 8 are denoted by the reference numerals used in FIG. 8, and descriptions thereof are omitted.

A configuration of an n-th first-side optical sensor 351'-n included in the first-side light-shielding sensor group is the same as the n-th first-side optical sensor 351-n included in the first-side light-shielding sensor group shown in FIG. 8 except that the n-th first-side optical sensor 351'-n included in the first-side light-shielding sensor group is not overlapped with any one of the first first-side light-receiving opening 991-1 to the third first-side light-receiving opening 991-3, and the anode electrode 615'-n is connected to the line SENSED. Therefore, description thereof is omitted.

Figure 20:
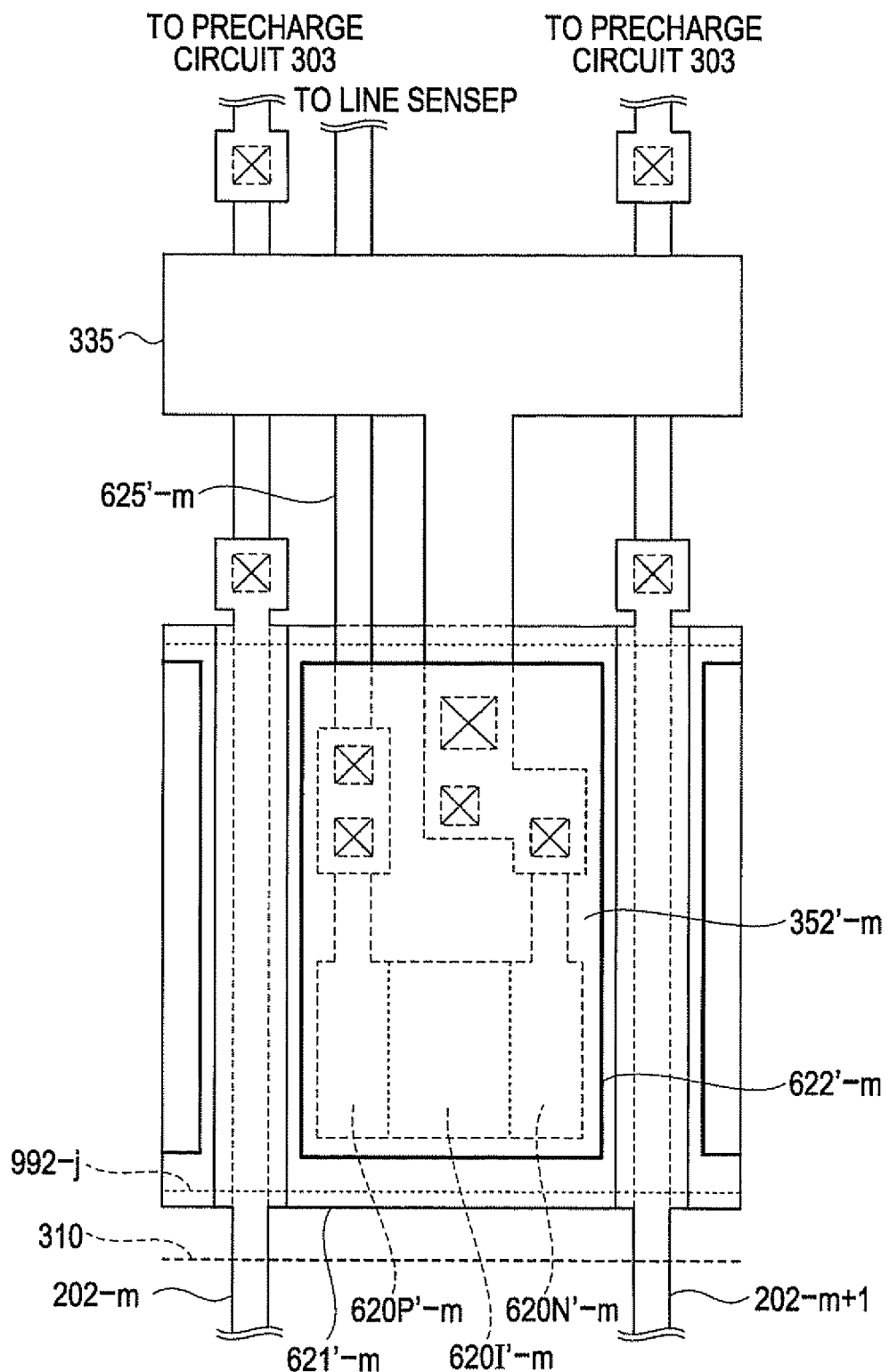
FIG. 20 is an enlarged plan view illustrating an n-th second-side optical sensor included in a second-side light-receiving sensor group according to the third embodiment of the invention.

FIG. 20 is an enlarged plan view illustrating an n-th second-side optical sensor 352'-m included in a second-side light-receiving sensor group according to the third embodiment and corresponds to the m-th second-side optical sensor 352-m of the first embodiment shown in FIG. 10. The explanatory note shown in FIG. 5 is also employed in FIG. 20. Different points between the m-th second-side optical sensor 352'-m shown in FIG. 20 and the m-th second-side optical sensor 352-m shown in FIG. 10 are mainly described hereinafter.

In FIG. 20, the m-th second-side optical sensor 352'-m is a lateral PIN junction diode including an anode region 620P'-m included in anode regions 620P', an intrinsic region 620I'-m included in intrinsic regions 620I', and a cathode region 620N'-m included in cathode regions 620N'. Such a configuration of the m-th second-side optical sensor 352'-m is the same as that of the m-th second-side optical sensor 351-m including the anode region 620P-m, the intrinsic region 620I-m, and the cathode region 620N-m according to the first embodiment shown in FIG. 10, and therefore, description thereof is omitted. The anode region 620P'-m is connected to an anode electrode 625'-m included in anode electrodes 625' through a contact hole, and the anode electrode 625'-m is connected to the line SENSEP. The cathode region 620N'-n, the light-shielding electrode 621'-m, and a transparent shielding electrode 622'-m included in transparent shielding electrodes 622' are connected to the common potential line 335 through corresponding contact holes so as to receive common potentials (COM) supplied thereto. Other configurations in FIG. 20 are the same as those shown in FIG. 10, and therefore, components shown in FIG. 20 which are similar to those shown in FIG. 10 are denoted by the reference numerals used in FIG. 10 and descriptions thereof are omitted.

A configuration of an m-th second-side optical sensor 352'-m included in the second-side light-shielding sensor group is the same as the m-th second-side optical sensor 352-n included in the second-side light-shielding sensor group shown in FIG. 10 except that the m-th second-side optical sensor 352'-m included in the second-side light-shielding sensor group is not overlapped with any one of the first second-side light-receiving opening 992-1 to the fourth second-side light-receiving opening 992-4, and the anode electrode 625'-m is connected to the line SENSED. Therefore, description thereof is omitted.

Arrangement of an n-th third-side optical sensor 353'-n which is arranged between a capacitor line 203-n–1 and a capacitor line 203-n is 180 degrees different from the arrangement of the n-th first-side optical sensor 351'-n shown in FIG. 19. Therefore, description of the arrangement of the n-th third-side optical sensor 353'-n is omitted. Similarly, arrangement of an m-th fourth-side optical sensor 354'-m is 180 degrees different from the arrangement of the m-th second-side optical sensor 352'-m shown in FIG. 20. Therefore, description of the arrangement of the m-th fourth-side optical sensor 354'-m is omitted.

Figure 21:
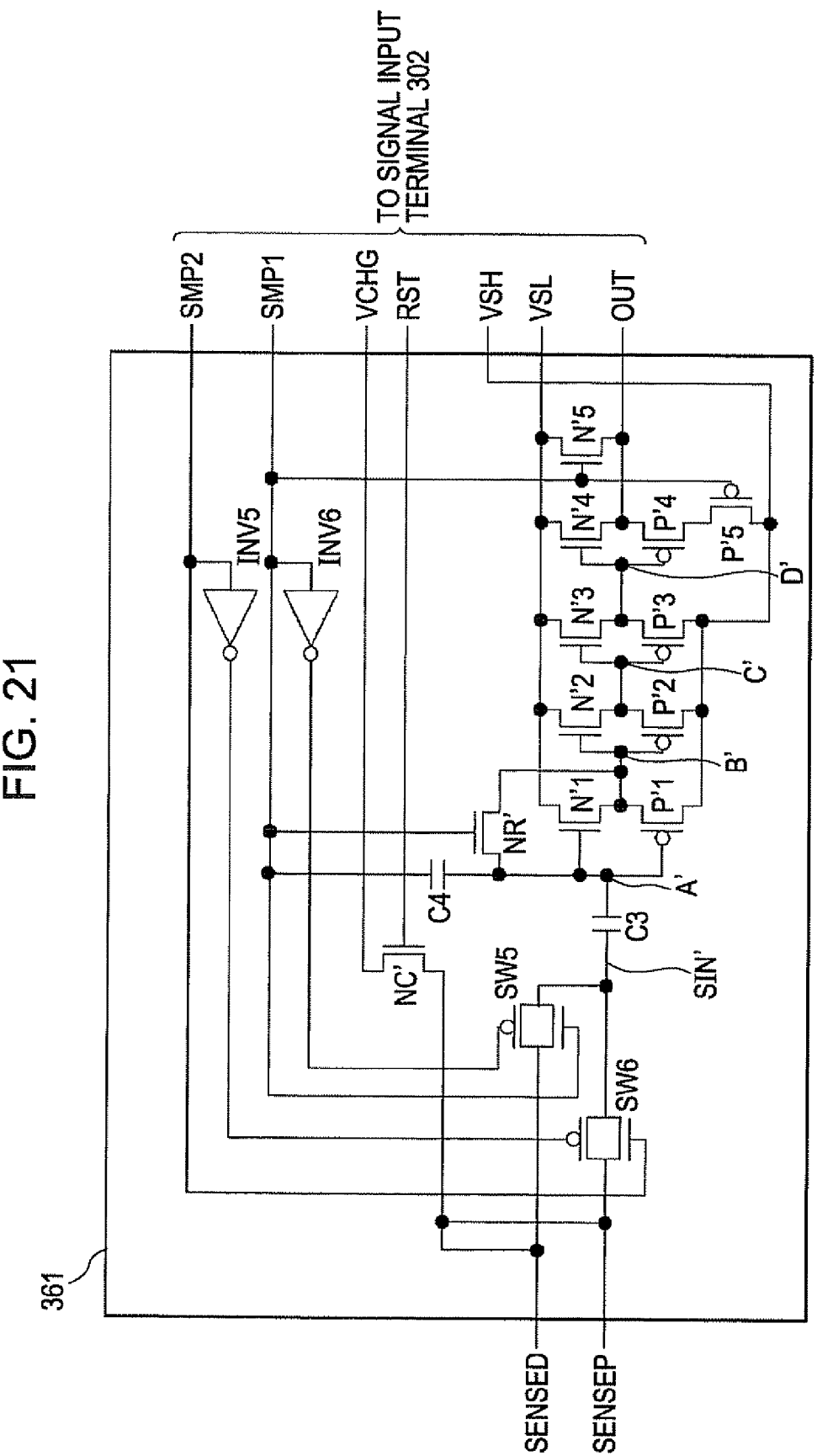
FIG. 21 is a circuit diagram illustrating a detection circuit according to the third embodiment of the invention.

FIG. 21 is a circuit diagram illustrating the detection circuit 361. A line SMP1, a line SMP2, a line RST, a line VCHG, a line VSL, and a line VSH are connected to a signal input terminals 320 so as to receive potentials and signals from an external power supply circuit 784 as needed. Here, the line VCHG has a potential VVCHG of –2.0V supplied thereto, the line VSL has a potential VVSL of 0.0V supplied thereto, and the line VSH has a potential VVSH of 5.0V supplied thereto. Note that the potential VVSL of the line VSL corresponds to a ground potential GND of the liquid crystal display device 910. An output line OUTn is connected to the signal input terminals 320 and further connected to an external circuit.

The line SENSED is connected to one end of a fifth switch SW5, and the line SENSEP is connected to one end of a sixth switch SW6. The other end of the fifth switch SW5 and the other end of the sixth switch SW6 are connected to a node SIN'. Each of the fifth switch SW5 and the sixth switch SW6 is constituted by a CMOS transmission gate. Among gate electrodes of the fifth switch SW5, a gate electrode of an n-channel transistor is connected to the line SMP1, and a gate electrode of a p-channel transistor is connected to an output terminal of an inverter circuit INV6. An input terminal of the inverter circuit INV6 is connected to the line SMP1. Among gate electrodes of the sixth switch SW6, a gate electrode of an n-channel transistor is connected to the line SMP2, and a gate electrode of a p-channel transistor is connected to an output terminal of an inverter circuit INV5. An input terminal of the inverter circuit INV5 is connected to the line SMP2.

The node SIN' is connected to one end of a third capacitor C3 and a drain electrode of an initialization transistor NC', and the other end of the third capacitor C3 is connected to a node A'. A source electrode of the initialization transistor NC' is connected to the line VCHG so as to receive the potential VVCHG of –2.0V. A gate electrode of the initialization transistor NC is connected to the line RST. The node A' is also connected to a gate electrode of a sixth N-type transistor N'1, a gate electrode of a sixth P-type transistor P'1, a drain electrode of a resetting transistor NR', and one end of a fourth capacitor C4. The other end of the fourth capacitor C4 is connected to the line RST.

A drain electrode of the sixth N-type transistor N'1, a drain electrode of the sixth P-type transistor P'1, and a source electrode of the resetting transistor NR' are connected to a node B'. The node B' is also connected to a gate electrode of a seventh N-type transistor N'2 and a gate electrode of a seventh P-type transistor P'2. A drain electrode of the seventh N-type transistor N'2 and a drain electrode of the seventh P-type transistor P'2 are connected to a node C'. The node C' is also connected to a gate electrode of an eighth N-type transistor N'3 and a gate electrode of an eighth P-type transistor P'3. A drain electrode of the eighth N-type transistor N'3 and a drain electrode of the eighth P-type transistor P'3 are connected to a node D'. The node D' is also connected to a gate electrode of a ninth N-type transistor N'4 and a gate electrode of a ninth P-type transistor P'4. A drain electrode of the ninth N-type transistor N'4 and a drain electrode of the ninth P-type transistor P'4 are connected to an output line OUTn. The output line OUTn is also connected to a drain electrode of a tenth N-type transistor N'5. A gate electrode of the tenth N-type transistor N'5 and a gate electrode of a tenth P-type transistor P'5 are connected to the line SMP1. A drain electrode of the tenth P-type transistor P'5 is connected to a source electrode of the ninth P-type transistor P'4. Source electrodes of the sixth N-type transistor N'1 to the tenth N-type transistor N'5 are connected to the line VSL so as to receive the potential VVSL of 0V supplied thereto. Source electrodes of the sixth P-type transistor P'1 to the eighth P-type transistor P'3 and the tenth P-type transistor P'5 are connected to the line VSH so as to receive the potential VVSH of +5V supplied thereto. In addition, electric power having a voltage of +9V and electric power having a voltage of −4V are supplied to the inverter circuit INV5 and the inverter circuit INV6.

Here, in this embodiment, the sixth N-type transistor N'1 has a channel width of 10 μm, the seventh N-type transistor N'2 has a channel width of 35 μm, the eighth N-type transistor N'3 has a channel width of 100 μm, the ninth N-type transistor N'4 has a channel width of 150 μm, and the tenth N-type transistor N'5 has a channel width of 150 μm. The sixth P-type transistor P'1 has a channel width of 10 μm, the seventh P-type transistor P'2 has a channel width of 35 μm, the eighth P-type transistor P'3 has a channel width of 100 μm, the ninth P-type transistor P'4 has a channel width of 300 μm, and the tenth P-type transistor P'5 has a channel width of 300 μm. The resetting transistor NR' has a channel width of 10 μm, and the initialization transistor NC' has a channel width of 150 μm. The N-type transistors and the P-type transistors of the fifth switch SW5 and the sixth switch SW6 each have channel widths of 100 μm, and the N-type transistors and the P-type transistors of the inverter circuit INV5 and the inverter circuit INV6 each have channel widths of 50 μm. All these N-type transistors each have channel lengths of 8 μm, and all these P-type transistors each have channel lengths of 6 μm. All these N-type transistors each have mobility of 80 $cm^2/Vsec$, and all these P-type transistors each have mobility of 60 $cm^2/Vsec$. All these N-type transistors each have threshold voltages (Vth) of +1.0V, and all these P-type transistors each have threshold voltages (Vth) of −1.0V. The third capacitor C3 has a capacitance of 1 pF, and the fourth capacitor C4 has a capacitance of 38 fF.

FIG. 22 is a timing chart according to the third embodiment. Note that the axis of ordinate and the axis of abscissa are not precisely shown in scale for convenience of explanation. Operations of the common potential line 335, the scanning line 201-1, the scanning line 201-2, and the line RST are the same as those shown in FIG. 12, and therefore, descriptions thereof are omitted. The line SMP1 is selected for 13.8 μsec every 69.2 μsec while the common potential line 335 has a low potential (0V). Similarly, after the line SMP1 is selected, the line SMP2 is selected for 13.8 μsec while the common potential line 335 has a low potential. Each of the line SMP1 and the line SMP2 has a high potential of +9V when selected, that is, when the potential thereof is high, whereas each of the line SMP1 and the line SMP2 has a low potential of −4V when not selected, that is, when the potential thereof is low.

With this configuration of the circuit, while the common potential line 335 has the low potential of 0V, the line SMP1 is first selected, the line SENSED is connected to the node SIN', and simultaneously, the node A' and the node B' are short-circuited to each other using the resetting transistor NR' so as to receive a voltage of 2.5V. In this period of time, a signal supplied to the output line OUT normally has a low potential of 0V. Next, when the line SMP1 is brought to a non-selection state after 13.8 μsec elapsed and simultaneously the line SMP2 is selected, the line SENSEP is connected to the node SIN', and the node A' and the node B' is electrically disconnected from each other and simultaneously a potential of the node A' is lowered to 2.0V since the fourth capacitor C4 is connected to the node A'. Thereafter, the potential of the node SIN' is changed from a potential corresponding to the line SENSED to a potential corresponding to the line SENSEP using the fifth switch SW5, and the potential of the node A' is also changed due to capacitance coupling. That is, immediately before the line SMP2 is brought to a non-selection state, the potential of the node A' is represented as follows: (2.0V)+(potential of line SENSEP)−(potential of line SENSED). When the potential of the node A' becomes larger than 2.5V, the detection circuit 361 outputs a high potential to the output line OUT. The potential of the line SENSED is changed in accordance with inclination proportional to a thermoelectric current supplied from the first-side light-shielding sensor group to the fourth-side light-shielding sensor group, and the potential of the line SENSEP is changed in accordance with inclination proportional to a result of addition of the thermoelectric current and a photoelectric current Iphoto supplied from the first-side light-receiving sensor group to the fourth-side light-receiving sensor group. Accordingly, a potential difference between the line SENSEP and the line SENSED is changed in accordance with inclination proportional to the photoelectric current Iphoto. Consequently, as with the first embodiment, a period of time from when the line RST is brought to a non-selection state to when the potential of the output line OUT first becomes high is inversely proportional to an intensity of external light.

Next, before the potential of the common potential line 335 becomes high (5V), the line SMP1 and the line SMP2 are brought to non-selection states. While the common potential line 335 has a high potential of 5V, the line SMP1 and the line SMP2 are not selected. As shown in the timing chart shown of FIG. 12, the potential of the line SENSED and the potential of the line SENSEP in this embodiment increase by 5V due to capacitance coupling when the potential of the common potential line 335 is brought to a high state (5V). However, as shown in FIG. 12, since the fifth switch SW5 and the sixth switch SW6 are closed, the potential of the node SIN' is not changed. Accordingly, as with the first embodiment, a detection operation is not influenced by the potential change of the common potential line 335 and is performed with high accuracy.

With this configuration of the detection circuit 361 of this embodiment, a period of time in which the node A' in the circuit is in a floating state is shorter and the detection circuit 361 is resistant to noise, when compared with the configuration of the detection circuits 360 of the first embodiment. However, the detection circuit 361 is likely to be influenced by switching noise generated by the fifth switch SW5 and the sixth switch SW6, and accordingly, detection accuracy may be deteriorated. The detection circuits 360 or the detection circuits 360 may be appropriately selected taking advantages thereof into consideration. In both the configurations, it is important that a common potential (COM) obtained when a resetting operation is terminated (that is, when the potential of the line RST returns to low in the embodiments) coincides with a common potential (COM) obtained while the detection circuit 361 operates (while the potentials of the line SMP, the line SMP1, and the line SMP2 are high in the embodiments). Accordingly, among known circuits other than the circuits in the embodiments of the invention, any circuit having such a configuration may be employed as the detection circuit 361.

Description of a liquid crystal display device in the third embodiment is omitted since the liquid crystal display device of the third embodiment is the same as the liquid crystal display device 910 of the first embodiment shown in FIG. 1 except that the active matrix substrate 101 is replaced by the active matrix substrate 102. Furthermore, a configuration of an electronic apparatus and a setting method of a light intensity and luminance of external light of this embodiment are the same as those of the first embodiment. Therefore, descriptions thereof are omitted.

In this embodiment, the common potential (COM) of the common potential line 335 is used as electric power for the optical sensors. Since the light-shielding electrodes and the transparent electrodes are connected to the common potential line 335 in this embodiment, the optical sensors are almost totally connected to the common potential (COM) of the common potential line 335, and the line SENSEP and the line SENSED are amplified with cycles and phases the same as those of the common potential line 335 and with potentials substantially the same as that of the common potential line 335. Therefore, a bias applied to a diode is barely changed in accordance with change of a polarity of the common potential line 335. Furthermore, when compared with the first embodiment, the number of lines are considerably reduced, and therefore, a small liquid crystal display device can be obtained. In addition, since a DC potential is supplied as a power supply potential to the detection circuit 361, the power supply potential is used for the scanning line driving circuit 301 and the data line driving circuit 302 in common. Therefore, the number of unnecessary power supply devices is prevented from increasing. Note that, in a case where the change of the potential of the common potential line 335 and increase of noise may cause deterioration of image quality, another power supply potential may be supplied to the optical sensors.

In this embodiment, the single line SENSEP provided for the four sides and the single line SENSED provided for the four sides are connected to the single detection circuit 361. However, as with the first embodiment, lines SENSEP may be provided for individual sides and lines SENSED may be provided for individual sides, and the detection circuit 361-1 to 361-4 may be provided for corresponding sides so that signals output from the detection circuits 361-1 to 361-4 are supplied to the majority determination circuit 370 of the first embodiment for determination. Inversely, the detection circuits of the first embodiment may be replaced by a single detection circuit so that the lines for individual sides are short-circuited to each other. According to this embodiment, since the lines for individual circuits are short-circuited to each other so as to make a single detection circuit, the size of the circuit is considerably reduced, and accordingly, the small liquid crystal display device 910 is attained. However, since an average intensity of external light around the sides is detected with this configuration, when the external light is blocked by a finger, for example, a detected light intensity is smaller than actual light intensity. Accordingly, the configuration according to the first embodiment or the configuration according to the second embodiment may be appropriately selected taking the configuration of the electronic apparatus, an operation method, and a size of the liquid crystal display device, for example, into consideration.

In the embodiments of this specification, the optical sensors are arranged on the four sides of the display region 310. However, the optical sensors may be arranged on three sides or less if there is a restriction on the size of the liquid crystal display device.

The invention is not limited to these embodiments, and, in addition to a TN (twist nematic) mode, a VA mode (vertical alignment mode), an IPS (in-plane-switching) mode utilizing a lateral electric field, or an FFS (fringe-field-switching) mode utilizing a fringe electric field may be employed in the liquid crystal display device. Furthermore, in addition to a total-transmission type liquid crystal display device, a total-reflection type liquid crystal display device or a liquid crystal display device of a combination of total-transmission type and total-reflection type may be used. Moreover, instead of such liquid crystal display devices, the invention may be employed in organic EL display devices, field emission display devices, or semiconductor devices other than the liquid crystal display devices.

Furthermore, in addition to the control of the display luminance in accordance with external light as described in the embodiments, a method of measuring the luminance and chromaticity of the display device may be employed and measurement results may be fed back to the display device so that display unevenness or aged deterioration are suppressed.

What is claimed is:
1. A display device comprising:
an active matrix circuit for display;
a display region having a plurality of bus lines intersecting with each other therein;
driving circuits which supply driving signals to the plurality of bus lines;
a plurality of optical sensors configured to receive external light, the optical sensors being arranged along each of four sides of and outside of the display region and disposed between each of the driving circuits and the display region;
sensor lines connected to the optical sensors;
a plurality of detection circuits which are connected to the sensor lines and which detect potentials or currents of the sensor lines;
a first substrate having a plurality of openings provided outside of the display region located in a plurality of sub-regions corresponding to the four sides;
a second substrate on which the plurality of optical sensors are provided; and
a majority determination circuit connected to each of the plurality of detection circuits,
wherein the detection circuits are arranged about a perimeter of the display region,
wherein a plurality of the optical sensors are provided in each of the sub-regions, the optical sensors including a first group of sensors that are overlapped with the opening and second group of sensors that are not overlapped with the openings, the first and second groups being alternately arranged within each of the sub-regions, and
wherein in sub-regions that are positioned opposite to one another on different sides of the display region, the first group of sensors on a first side that are overlapped are positioned opposite to the second groups of sensors on a second side that are not overlapped.

2. The display device according to claim 1, further comprising:
a plurality of pixel electrodes connected to the active matrix circuit;
a common electrode driven so that a potential of the common electrode is switched between a first potential and a second potential which is lower than the first potential; and
wherein liquid crystal elements alignment states of which are changed in accordance with an electric field applied between the plurality of pixel electrodes and the common electrode; and
wherein the detection circuit detects the potentials or the currents of the sensor lines when a first period of time which is one of a period of time in which the potential of the common electrode corresponds to the first potential and a period of time in which the potential of the common electrode corresponds to the second potential is entered.

3. The display device according to claim 2,
wherein the detection circuit repeatedly performs a resetting operation of resetting the potentials of the sensor lines to initial states, and the resetting operation is performed in a second period of time which is the other of the period of time in which the potential of the common electrode corresponds to the first potential and the period of time in which the potential of the common electrode corresponds to the second potential is entered.

4. The display device according to claim 2,
wherein the potentials of the sensor lines are changed when the potential of the common electrode is changed.

5. The display device according to claim 3,
wherein the sensor lines are short-circuited to the common electrode.

6. The display device according to claim 3,
wherein the sensor lines are connected to power supply lines which receive potentials supplied from an external device in the second period of time, and are brought to floating states in the first period of time.

7. The display device according to claim 1, further comprising:
first electrodes arranged in regions overlapped with the optical sensors in a plan view; and
second electrodes arranged in regions in which the first electrodes are overlapped with the bus lines.

8. The display device according to claim 7,
wherein the second electrodes are connected to the common electrode.

9. The display device according to claim 8,
wherein the first electrodes function as a plurality of light-shielding electrodes for shielding backlight, and
the bus lines and the second electrodes are arranged in gaps interposed among the plurality of light-shielding electrodes.

10. The display device according to claim 2,
wherein the majority determination circuit changes an output signal when at least two of a plurality of results of detections output from the plurality of detection circuits are changed.

11. The display device according to claim 10,
wherein the plurality of detection circuits include a first and a second detection circuits, and among the optical sensors, optical sensors connected to the first detection circuit and optical sensors connected to the second detection circuit are arranged on different sides of the active matrix circuit.

12. The display device according to claim 1,
wherein the optical sensors are PIN junction diodes or PN junction diodes formed of polysilicon thin films, and the driving circuits include polysilicon thin film transistors.

13. An electronic apparatus including the display device according to claim 1.

14. A display device comprising:
an active matrix circuit for display;
a display region having a plurality of bus lines intersecting with each other therein, the plurality of bus lines being connected to the active matrix circuit;
driving circuits which supply driving signals to the plurality of bus lines;
a plurality of optical sensors configured to receive external light, the optical sensors being arranged along each of four sides of and outside of the display region and in a plurality of sub-regions separated by the plurality of bus lines, wherein the plurality of the sub-regions are arranged between the active matrix circuit and each of the driving circuits;
a first substrate having a plurality of openings provided outside of the display region located in a plurality of sub-regions corresponding to the four sides; and
a second substrate on which the plurality of optical sensors are provided,
wherein a plurality of the optical sensors are provided in each of the sub-regions, the optical sensors including a first group of sensors that are overlapped with the opening and second group of sensors that are not overlapped with the openings, the first and second groups being alternately arranged within each of the sub-regions, and
wherein in sub-regions that are positioned opposite to one another on different sides of the display region, the first group of sensors on a first side that are overlapped are positioned opposite to the second groups of sensors on a second side that are not overlapped.

15. The display device according to claim 14, wherein the optical sensors comprise an anode region, an intrinsic region, and a cathode region to form a lateral PIN junction diode.

* * * * *